(12) United States Patent
Miller et al.

(10) Patent No.: US 10,178,076 B2
(45) Date of Patent: *Jan. 8, 2019

(54) CRYPTOGRAPHIC SECURITY FUNCTIONS BASED ON ANTICIPATED CHANGES IN DYNAMIC MINUTIAE

(71) Applicant: mSignia, Inc., Irvine, CA (US)

(72) Inventors: Paul Timothy Miller, Irvine, CA (US); George Allen Tuvell, Thompson's Station, TN (US)

(73) Assignee: MSIGNIA, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,294

(22) Filed: Apr. 23, 2018

(65) Prior Publication Data

US 2018/0248856 A1    Aug. 30, 2018

Related U.S. Application Data

(63) Continuation of application No. 15/635,969, filed on Jun. 28, 2017, now Pat. No. 9,979,707, which is a
(Continued)

(51) Int. Cl.
*H04L 29/06* (2006.01)
*H04L 9/32* (2006.01)
(Continued)

(52) U.S. Cl.
CPC ........ *H04L 63/0457* (2013.01); *H04L 9/0861* (2013.01); *H04L 9/0866* (2013.01);
(Continued)

(58) Field of Classification Search
CPC . H04L 63/0457; H04L 63/145; H04L 9/0861; H04L 9/0876
See application file for complete search history.

(56) References Cited

U.S. PATENT DOCUMENTS

| 5,490,216 A | 2/1996 | Richardson, III |
| 5,903,721 A | 5/1999 | Sixtus |

(Continued)

FOREIGN PATENT DOCUMENTS

| JP | 2006/319283 | 11/2006 |
| JP | 2008516472 | 5/2008 |

(Continued)

OTHER PUBLICATIONS

Jakobsson et al., "Implicit Authentication for Mobile Devices," HotSec'09 Proceedings of the 4th USENIX conference on Hot topics in security, 2009, USENIX Association, Berkeley, California/ USA. Retrieved from the Internet on Nov. 18, 2016: <URL:https://www.usenix.org/legacy/event/hotsec09/tech/full_papers/jakobsson.pdf>.

(Continued)

*Primary Examiner* — Dao Q Ho
(74) *Attorney, Agent, or Firm* — Haynes and Boone, LLP

(57) ABSTRACT

Dynamic key cryptography validates mobile device users to cloud services by uniquely identifying the user's electronic device using a very wide range of hardware, firmware, and software minutiae, user secrets, and user biometric values found in or collected by the device. Processes for uniquely identifying and validating the device include: selecting a subset of minutia from a plurality of minutia types; computing a challenge from which the user device can form a response based on the selected combination of minutia; computing a set of pre-processed responses that covers a range of all actual responses possible to be received from the device if the combination of the particular device with the device's collected actual values of minutia is valid; receiving an actual response to the challenge from the device; determining whether the actual response matches any of the
(Continued)

pre-processed responses; and providing validation, enabling authentication, data protection, and digital signatures.

20 Claims, 11 Drawing Sheets

Related U.S. Application Data continuation of application No. 15/076,543, filed on Mar. 21, 2016, now Pat. No. 9,722,804, which is a continuation of application No. 14/458,123, filed on Aug. 12, 2014, now Pat. No. 9,294,448, which is a continuation of application No. 13/366,197, filed on Feb. 3, 2012, now Pat. No. 8,817,984.

(60) Provisional application No. 61/462,474, filed on Feb. 3, 2011.

(51) Int. Cl.
*H04L 9/08* (2006.01)
*H04L 9/16* (2006.01)

(52) U.S. Cl.
CPC .............. *H04L 9/0872* (2013.01); *H04L 9/16* (2013.01); *H04L 9/3231* (2013.01); *H04L 9/3247* (2013.01); *H04L 9/3271* (2013.01); *H04L 63/0428* (2013.01); *H04L 63/061* (2013.01); *H04L 63/083* (2013.01); *H04L 63/0861* (2013.01); *H04L 63/0876* (2013.01)

(56) References Cited

U.S. PATENT DOCUMENTS

| | | | |
|---|---|---|---|
| 5,983,273 | A | 11/1999 | White et al. |
| 6,041,133 | A | 3/2000 | Califano et al. |
| 6,148,407 | A | 11/2000 | Aucsmith |
| 6,167,517 | A | 12/2000 | Gilchrist et al. |
| 6,185,316 | B1 | 2/2001 | Buffam |
| 6,215,898 | B1 | 4/2001 | Woodfill et al. |
| 6,219,793 | B1 | 4/2001 | Li et al. |
| 6,338,138 | B1 | 1/2002 | Raduchel et al. |
| 7,133,792 | B2 | 11/2006 | Murakami et al. |
| 7,240,364 | B1 | 7/2007 | Branscomb et al. |
| 7,272,728 | B2 | 9/2007 | Pierson et al. |
| 7,330,871 | B2 | 2/2008 | Barber |
| 7,333,638 | B2 | 2/2008 | Chisamore et al. |
| 7,333,871 | B2 | 2/2008 | Schwarm |
| 7,373,669 | B2 | 5/2008 | Eisen |
| 7,571,472 | B2 | 8/2009 | Royer |
| 7,606,560 | B2 | 10/2009 | Labrou et al. |
| 7,748,029 | B2 | 6/2010 | Ross |
| 7,805,606 | B2 | 9/2010 | Birger et al. |
| 7,908,662 | B2 | 3/2011 | Richardson |
| 7,920,851 | B2 | 4/2011 | Moshir et al. |
| 7,937,467 | B2 | 5/2011 | Barber |
| 7,995,196 | B1 | 8/2011 | Fraser |
| 8,050,241 | B2 | 11/2011 | Abdel-kader |
| 8,213,907 | B2 | 7/2012 | Etchegoyen |
| 8,285,994 | B2 | 10/2012 | Shah et al. |
| 8,312,157 | B2 | 11/2012 | Jakobsson et al. |
| 8,316,412 | B2 | 11/2012 | Choi et al. |
| 8,316,421 | B2 | 11/2012 | Etchegoyen |
| 8,335,925 | B2 | 12/2012 | Taugbol |
| 8,347,106 | B2 | 1/2013 | Tsuria et al. |
| 8,375,221 | B1 | 2/2013 | Thom et al. |
| 8,489,067 | B2 | 7/2013 | Rackley, III et al. |
| 8,590,021 | B2 | 11/2013 | Steeves et al. |
| 8,639,926 | B2 | 1/2014 | Brown et al. |
| 8,726,347 | B2 | 5/2014 | Hamilton, II et al. |
| 8,782,396 | B2 | 7/2014 | Ziola et al. |
| 8,817,984 | B2 | 8/2014 | Miller et al. |
| 8,838,967 | B1 | 9/2014 | Mills et al. |
| 8,961,619 | B2 | 2/2015 | Gum |
| 9,165,011 | B2 | 10/2015 | Wang et al. |
| 9,294,448 | B2 | 3/2016 | Miller et al. |
| 9,603,016 | B1 | 3/2017 | Mills et al. |
| 9,801,048 | B1 | 10/2017 | Mills et al. |
| 2003/0037237 | A1 | 2/2003 | Abgrall et al. |
| 2003/0084311 | A1 | 5/2003 | Merrien et al. |
| 2003/0097562 | A1 | 5/2003 | Wheeler et al. |
| 2004/0144841 | A1 | 7/2004 | Tsukamoto et al. |
| 2004/0177354 | A1 | 9/2004 | Gunyakti et al. |
| 2005/0166053 | A1 | 7/2005 | Cui et al. |
| 2005/0278542 | A1 | 12/2005 | Pierson et al. |
| 2006/0031676 | A1 | 2/2006 | Vantalon et al. |
| 2006/0104484 | A1 | 5/2006 | Bolle et al. |
| 2006/0120578 | A1 | 6/2006 | Shatford |
| 2006/0173781 | A1 | 8/2006 | Donner |
| 2006/0282660 | A1 | 12/2006 | Varghese et al. |
| 2007/0061590 | A1 | 3/2007 | Boye et al. |
| 2007/0113090 | A1 | 5/2007 | Villela |
| 2007/0124801 | A1 | 5/2007 | Thomas et al. |
| 2007/0174206 | A1 | 7/2007 | Colella |
| 2007/0214151 | A1 | 9/2007 | Thomas et al. |
| 2007/0234427 | A1 | 10/2007 | Gardner et al. |
| 2007/0240217 | A1 | 10/2007 | Tuvell et al. |
| 2007/0240218 | A1 | 10/2007 | Tuvell et al. |
| 2007/0240219 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2007/0249364 | A1 | 10/2007 | Bells et al. |
| 2007/0283416 | A1 | 12/2007 | Renaud |
| 2008/0065553 | A1 | 3/2008 | Faith et al. |
| 2008/0086773 | A1 | 4/2008 | Tuvell et al. |
| 2008/0086776 | A1 | 4/2008 | Tuvell et al. |
| 2008/0162383 | A1 | 7/2008 | Kraft |
| 2008/0175449 | A1 | 7/2008 | Fang et al. |
| 2008/0196104 | A1 | 8/2008 | Tuvell et al. |
| 2008/0212846 | A1 | 9/2008 | Yamamoto et al. |
| 2008/0222706 | A1 | 9/2008 | Renaud et al. |
| 2008/0235515 | A1 | 9/2008 | Yedidia et al. |
| 2008/0244744 | A1 | 10/2008 | Thomas et al. |
| 2009/0025084 | A1 | 1/2009 | Siourthas et al. |
| 2009/0138975 | A1 | 5/2009 | Richardon |
| 2009/0310779 | A1 | 12/2009 | Lam et al. |
| 2010/0027834 | A1 | 2/2010 | Spitzig et al. |
| 2010/0080425 | A1 | 4/2010 | Bebis et al. |
| 2010/0146263 | A1 | 6/2010 | Das et al. |
| 2010/0192209 | A1 | 7/2010 | Steeves et al. |
| 2010/0229224 | A1 | 9/2010 | Etchegoyen |
| 2010/0296653 | A1 | 11/2010 | Richardson |
| 2010/0332400 | A1 | 12/2010 | Etchegoyen |
| 2011/0007177 | A1 | 1/2011 | Kang |
| 2011/0016534 | A1 | 1/2011 | Jakobsson et al. |
| 2011/0082768 | A1 | 4/2011 | Eisen |
| 2011/0093503 | A1 | 4/2011 | Etchegoyen |
| 2011/0093920 | A1 | 4/2011 | Etchegoyen |
| 2011/0113388 | A1 | 5/2011 | Eisen et al. |
| 2011/0293094 | A1 | 12/2011 | Os et al. |
| 2011/0296170 | A1 | 12/2011 | Chen |
| 2012/0030771 | A1 | 2/2012 | Pierson et al. |
| 2012/0201381 | A1 | 8/2012 | Miller et al. |
| 2013/0340052 | A1 | 12/2013 | Jakobsson |
| 2014/0229386 | A1 | 8/2014 | Tervo et al. |

FOREIGN PATENT DOCUMENTS

| | | |
|---|---|---|
| JP | 2009111971 | 5/2009 |
| JP | 2010/129045 | 6/2010 |
| WO | WO 2010/035202 | 4/2010 |
| WO | WO 2013/138714 | 9/2013 |
| WO | WO 2013/154936 | 10/2013 |

OTHER PUBLICATIONS

Maeda, Takashi, "Biometrics complex authentication system capable of realizing accurate, rapid identity authentication instantly," Monthly Bar Code, Aug. 2, 2001, pp. 64-66, vol. 14, Issue 9, Japan Industrial Publishing Co., Ltd., Japan.

(56) References Cited

OTHER PUBLICATIONS

Shibata, Yoichi, "Mechanism-based PKI," Computer Security Symposium, Oct. 29, 2003, vol. 2003, No. 15, pp. 181-186, Information Processing Society of Japan, Japan.
Juels et al., "A Fuzzy Vault Scheme," Designs, Codes and Cryptography, Feb. 2006, pp. 237-257, vol. 38, No. 2, Springer Science + Business Media, Inc., New York/USA.
Notice of Reasons for Rejection dated Sep. 6, 2016, Japanese Patent Application No. P2014/555571.
Inauth, Inc., "Defendant Inauth, Inc.'s Preliminary Invalidity Contentions", *mSIGNIA, Inc.* v. *InAuth, Inc.*, No. 8:17-cv-1289, Dkt. No. 1, Complaint, Jan. 4, 2018, 20 pages.
Eckersley, Peter, "How Unique Is Your Web Browser?", Electronic Frontier Foundation, 2010, 19 pages, IPR Document No. IAPRIORART00000070-00000088.
"Adaptive Authentication for the Enterprise", RSA, The Security Division of EMC, 2009, 4 pages, IPR Document IAPRIORART00003020-00003023.
"RSA Solution Brief, RSA Adaptive Authentication, Balancing Risk, Cost, and Convenience", RSA, The Security Division of EMC, 2008, 12 pages, IPR Document No. IAPRIORART00003024-00003035.
"RSA Adaptive Authentication for Financial Services", RSA, The Security Division of EMC, Sep. 2008, 4 pages, IPR Document No. IAPRIORART00003036-00003039.
"RSA Adaptive Authentication", Jan. 2, 2010, 3 pages [online], [retrieved on Dec. 12, 2017]. Retrieved from the Internet: <URL:https://web.archive.org/web/20100102005728/http://rsa.com/node.aspx?id=3018>, IPR Document No. IAPRIORART00003040-00003042.
"RSA Solution Brief, RSA Adaptive Authentication, Offering Multiple Ways to Provide Strong Two-Factor Authentication to End Users", RSA, The Security Division of EMC, 2008, 4 pages, IPR Document No. IAPRIORART00003043-00003046.
"RSA SecurID Software Token 4.1 Administrator's Guide", RSA, The Security Division of EMC, Nov. 2009, 98 pages, IPR Document No. IAPRIORART00003047-00003144.
"RSA Authentication Decision Tree", RSA EMC2, 2011, 12 pages, IPR Document No. IAPRIORART00003145-00003156.
Stallings et al., "Computer Security: Principles and Practice", 2008, 136 pages, Pearson Education, Inc., Upper Saddle River, NJ, IPR Document No. IAPRIORART00003157-00003292.
Tolbert, John, "Adaptive Authentication", Leadership Compass, Feb. 2017, pp. 1-38, Kuppinger Cole Ltd., Wiesbaden, Germany, IPR Document No. IAPRIORART00003293-00003330.
"Product Sheet: CA Arcot RiskFort", ca technologies, 2010, 6 pages, IPR Document No. IAPRIORART00003331-00003336.
"Arcot RiskFort Fraud Detection", Dec. 8, 2010, 2 pages [online], [retrieved on Dec. 27, 2017]. Retrieved from the Internet: <URL:https://web.archive.org/web/20101208212852/http://arcot.com/products/riskfort/index.html>, IPR Document No. IAPRIORART00003337-00003338.
"Data Sheet: CA Risk Authentication", ca technologies, 2015, 2 pages, IPR Document No. IAPRIORART00003339-00003340.
"Arcot RiskFort Administration Guide Version 2.2.6", Sep. 2010, 346 pages, Arcot Systems, Inc., Sunnyvale, CA, IPR Document No. IAPRIORART00003341-00003686.
"Arcot RiskFort Fraud Detection and Prevention Data Sheet", Sep. 2008, 2 pages, Arcot Systems, Inc., Sunnyvale, CA, IPR Document No. IAPRIORART00003687-00003688.
"Arcot RiskFort Installation and Deployment Guide (for Red Hat Enterprise Linux4.0)", Mar. 2009, 204 pages, Arcot Systems, Inc., Sunnyvale, CA, IPR Document No. IAPRIORART00003689-00003892.
"Arcot RiskFort Installation and Deployment Guide (for Windows Platforms)", Sep. 2010, 226 pages, Arcot Systems, Inc., Sunnyvale, CA, IPR Document No. IAPRIORART00003893-00004118.
"Arcot RiskFort Fraud Detection", Jan. 2, 2010, 2 pages [online], [retrieved on Jan. 1, 2018]. Retrieved from the Internet: <URL:https://web.archive.org/web/20100102005021/http://arcot.com/products/riskfort/index.html>, IPR Document No. IAPRIORART00004119-00004120.
Miller et al., "System and Method for Cryptographic Security Functions Based on Anticipated Changes in Computer Minutia," U.S. Appl. No. 61/462,474, filed Feb. 3, 2011, pp. 1-35, United States Patent and Trademark Office.
Etchegoyen, Craig S., "System and Method for Device Authentication With Built-In Tolerance," U.S. Appl. No. 61/252,960, filed Oct. 19, 2009, pp. 1-40, United States Patent and Trademark Office.
Kohno et al., "Remote Physical Device Fingerprinting," IEEE Transactions on Dependable and Secure Computing, May 2005, pp. 93-108, vol. 2—No. 2, IEEE, Pescataway, New Jersey/USA.
Pang et al., "802.11 User Fingerprinting," Annual International Conference on Mobile Computing and Networking, Sep. 2007, pp. 1-12, Association for Computing Machinery, Montreal/Canada.
Angwin et al., "Race is on to 'Fingerprint' Phones, PCs," Wall Street Journal, Nov. 30, 2010, pp. 1-7 [online], [retrieved on Oct. 27, 2017]. Retrieved from the Internet: <URL: https://www.wsj.com/articles/SB10001424052748704679204575646704100959546>.
Denning et al., "Location-Based Authentication: Grounding Cyberspace for Better Security," Computer Fraud & Security, Feb. 1996, pp. 12-16, Elsevier Science Ltd., Amsterdam/Netherlands.
Cortes et al., "Communities of Interest," Lecture Notes in Computer Science, Sep. 3, 2001, pp. 1-10, vol. 2189, Springer-Verlag Berlin Heidelberg, Berlin/Germany.
Johansen et al., "Email Communities of Interest," Proceedings of the 4th Conference on Email and Anti-Spam, 2007, pp. 1-8, CEAS, Mountain View, California/USA.
Aiello et al., "Analysis of Communities of Interest in Data Networks," Lecture Notes in Computer Science, 2005, pp. 1-14, vol. 3431, Springer-Verlag Berlin Heidelberg, Berlin/Germany.
Smart et al., "Defeating TCP/IP Stack Fingerprinting," Proceedings of the 9th USENIX Security Symposium, Aug. 2000, pp. 1-12, The USENIX Association, Berkeley, California/USA.
Milligan, Brian, "The man who invented the cash machine," BBC News, Jun. 25, 2007, pp. 1-2 [online], [retrieved on Oct. 27, 2017]. Retrieved from the Internet: <URL:http://news.bbc.co.uk/2/hi/business/6230194.stm>.
Traynor, Patrick, "Declaration of Dr. Patrick Traynor," Nov. 1, 2017, pp. 1-154, Submitted before the Patent Trial and Appeal Board, United States Patent and Trademark Office.
Traynor, Patrick Gerard, "Curriculum Vitae," Nov. 1, 2017, pp. 1-41.
Harada, et al., "Discussion of Method for Recognition of Individual Identity Based on Feature Analysis in Secular Change, Symposium", Institute of Electronics, Information and Communication Engineers, Image Recognition and Comprehension Symposium (MIRU) [online], Jul. 20, 2011, IS2-41, pp. 780-785 (9 total pages with English abstract and miscellaneous).
Mori et al., "Challenge and Response type Recognition with Biological Information as Key, in Collection of Academic Paper for General Lecture", FIT 2006 Fifth Forum of Information Science & Technology, Institute of Electronics, Information and Communication Engineers, Aug. 21, 2006, Forth Book, M_048, pp. 301-302 (14 total pages with English translation and miscellaneous).

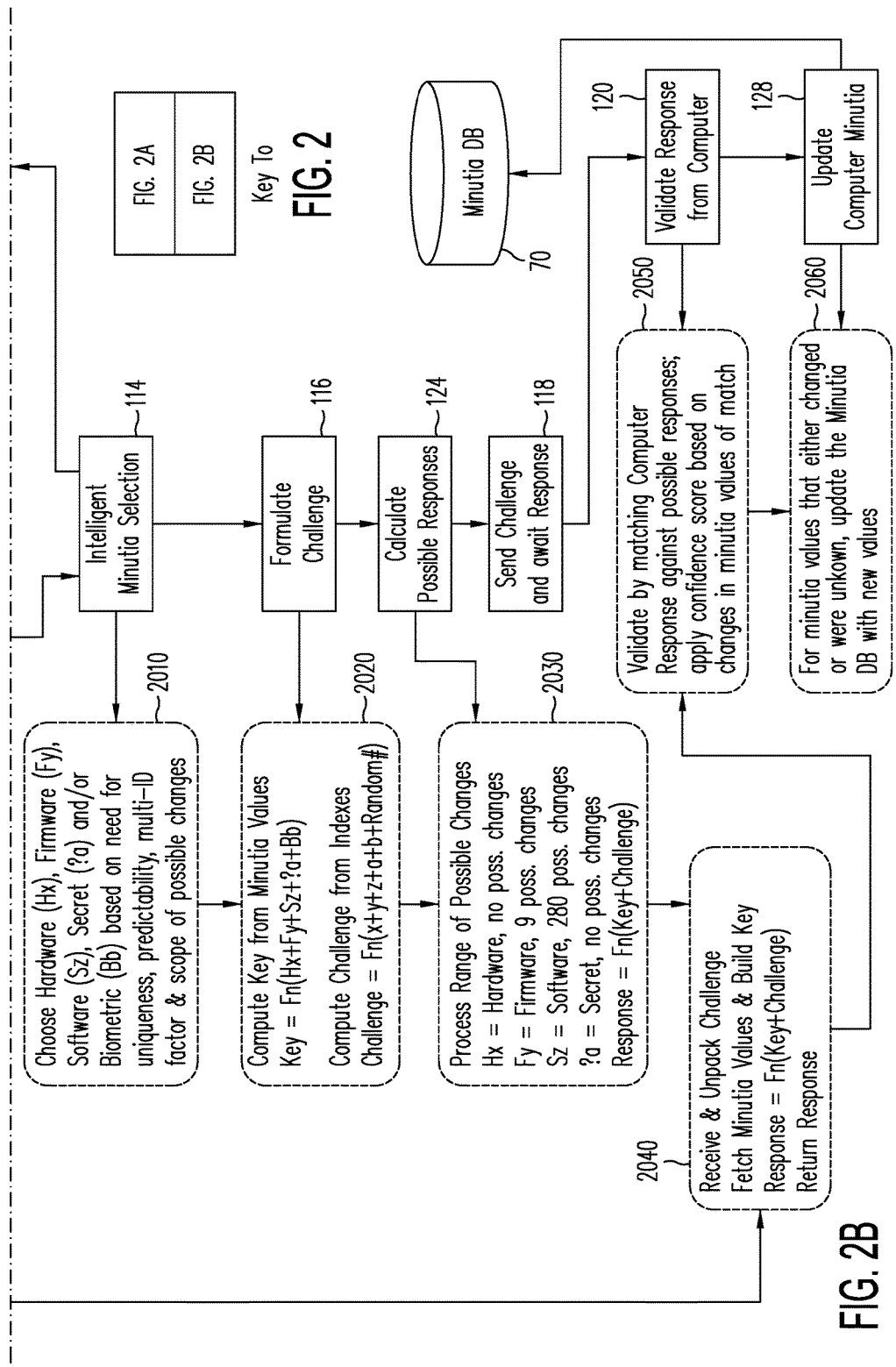

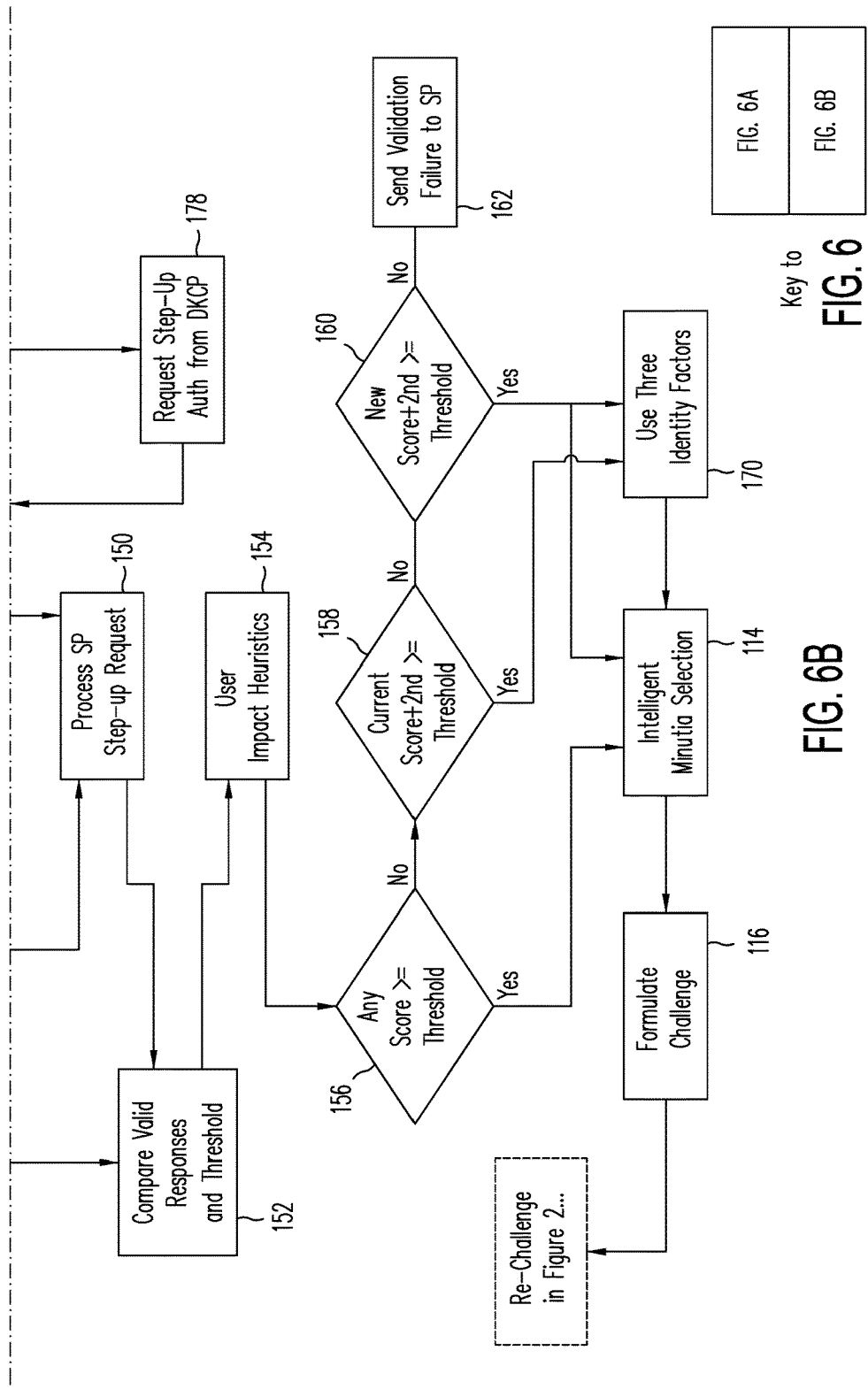

CRYPTOGRAPHIC SECURITY FUNCTIONS BASED ON ANTICIPATED CHANGES IN DYNAMIC MINUTIAE

CROSS REFERENCE TO RELATED APPLICATIONS

This application is a continuation of U.S. patent application Ser. No. 15/635,969 filed Jun. 28, 2017, which is a continuation of U.S. patent application Ser. No. 15/076,543 filed Mar. 21, 2016, now U.S. Pat. No. 9,722,804, issued Aug. 1, 2017, which is a continuation of U.S. patent application Ser. No. 14/458,123 filed Aug. 12, 2014, now U.S. Pat. No. 9,294,448, issued Mar. 22, 2016, which is a continuation of and claims benefit of priority to U.S. patent application Ser. No. 13/366,197 filed Feb. 3, 2012, now U.S. Pat. No. 8,817,984, issued Aug. 26, 2014, which claims the benefit of U.S. Provisional Patent Application No. 61/462,474 filed Feb. 3, 2011, the contents of all of which are incorporated by reference.

BACKGROUND

Technical Field

The present disclosure generally relates to dynamic key cryptography used, for example, for authentication between a client electronic device and a service provider, encryption of data communications, and digital signatures and, more particularly, to cryptography using dynamic keys derived from dynamically changing key material.

Related Art

Use of computers for connecting to a network (such as the Internet) and communicating with a variety of services risks the privacy of many types of information belonging to a user including, for example, the user's relationships (e.g., social connections), business secrets, banking details, payment options, and health records. The use of cryptography is common to authenticate identities, protect data, and digitally sign the summary (i.e. digest) of an action.

Cryptography generally uses an algorithm (e.g., Advanced Encryption Standard (AES), Rivest Shamir Adelman (RSA)) to combine cryptographic keys (which may be symmetric, public, or private, for example) with plain text to form cipher text. Cryptography keys are typically random numbers without any special meaning. The process of distributing cryptographic keys and storing them on a client computer (referred to as "key management") is difficult to perform securely and is often the point-of-attack for breaking the security of a cryptographic system. The key represents a single sequence of data and thus a single point-of-failure for the cryptographic system. Since the key normally must be present at the client computer, finding the key and then copying it to another computer can allow an imposter entity to masquerade as a valid entity.

Secure elements (e.g., smartcards) can securely store the cryptographic key and, in some instances, generate the key in a secure environment. Access to the key was typically controlled by requiring the user to enter a personal identification number (PIN); this ensured that the user had to provide a secret before the secure element would allow use of the key. Such access to a key is commonly known as two-factor authentication, and the two factors are generally referred to as: "Something You Know" and "Something You Have". A third factor, "Something You Are", can include, for example, biometric information. The factors themselves are related in use but entirely separate in material. Possession of the physical secure element ("Something You Have") may be via validation of cryptographic functions using the random number cryptographic key provisioned to a particular secure element whose use may be protected by a secret PIN ("Something You Know"). There is no implicit binding between the key and the user.

The use of certificates in cryptography enabled the binding of a distinguished name (e.g., a unique user) with a cryptographic key. Yet, still the cryptographic key is a random number, and when the key is validated, the cryptographic system attributes the user in the certificate to the usage of the key; the key matter itself has no relation to the user.

On the Internet, ensuring a real-world identity for the user is critical for protecting data and privacy. Mobile users especially are at risk because they often do not use anti-virus applications and many of the service providers use applications (apps) optimized for simplicity, not security. This leaves much of the private data meaningful to both a user's identity and a service's value inadequately protected. Since online service providers (OSP) incur much of the risk, safety has become their responsibility.

The standard method for identifying a user to an online service is by entering a username and password. The username is a known service index and, as such, can be stored on the computer for convenience. The password is a user secret verifiable by the OSP; it should not be stored at the computer, where it can be compromised. However, because a quality password has many characters which should be a mix of upper, lower, punctuation and special characters, the password is often difficult and time-consuming to type. This is especially true on a mobile computer using touch keypads that have various 'levels' of keypads for characters beyond simple alpha-numeric. Thus, many mobile apps store the password on the computer. Because mobile operating systems require mobile apps to be signed in order to run, the apps themselves cannot be altered after installation. So, any data stored by the mobile app is separate from the mobile app and often can be vulnerable to attack. Furthermore, because the app cannot change, if encryption was used to protect the cached password, there could only be one encryption key for all instances of the application. This commonality made harvesting and cracking stored passwords on a mobile computer relatively simple, even if the passwords were encrypted, since they all used the same key for decryption.

Computer and computer identification has been attempted by calculating a hash of the minutia found on a computer to uniquely identify the computer, often referred to as a computer fingerprint. Computer fingerprints typically are used, among other things, to 'lock' software to a particular computer fingerprint and identify computers used in online actions to profile the history and potential risk of particular actions. A typical computer identifier is computed and remains static; to ensure reliability the computer fingerprint typically uses computer minutiae (e.g., serial numbers) that normally do not change. Thus, current computer fingerprints typically use a relatively small set of static minutia which may be prone to spoofing. Some approaches to improving computer identification have sought to increase the number of minutiae used in identifying the computer through the analysis of time (both in clock and network latency) and bits of information left on the computer (i.e. 'cookies'). However, as more minutiae are included in the computation, the probability that changes occurred naturally to the minutia can result in a new computer fingerprint. This falsely identifies a computer as 'different' when it is actually the same computer (often referred to as 'false negatives'). These changes to the minutia on a unique computer occur naturally during normal use and can invalidate the computer fingerprint process or inconvenience the user or service by forcing a re-initialization of the computer fingerprint.

SUMMARY

According to one or more embodiments of the present invention, methods and systems for dynamic key cryptography use a wide range of minutiae as key material including computer hardware, firmware, software, user secrets, and user biometrics rather than store a random number as a cryptographic key on the computer. Methods and systems for using dynamic key cryptography, according to one or more embodiments, can be used for authenticating users to services, ciphering data for protection, and digitally signing message digests. In one embodiment, dynamic key cryptography anticipates changes to computers caused by industry updates to hardware, firmware, and software of computers.

In one embodiment, a method of dynamic key cryptography includes: selecting a subset from a set of minutia types; for a particular device, sending a challenge to the device, in which: the challenge includes information from which the device can collect actual values of minutia corresponding to the selected subset of minutia types in order to form a cryptographic key; the cryptographic key is never transmitted from the device across any communication channel, and the cryptographic key is used to encrypt an actual response to the challenge; pre-processing a set of responses to the challenge based on tracking updates of minutia from which the selected subset of minutia types is selected, in which: the set of pre-processed responses covers a range of all actual responses possible to be received from the particular device if the combination of the particular device with collected actual values of minutia is valid; comparing the actual response from the particular device to the set of pre-processed responses; and validating the combination of the particular device with the collected actual values if the actual response is included in the set of pre-processed responses for the particular device.

In another embodiment, a method includes: selecting at least one type of minutia from a plurality of minutia types; forming a challenge that conveys the selection of minutia types; computing a plurality of pre-processed responses possible to receive from a valid device, in which: each pre-processed response is computed using a key, each key is computed using values that are possible for the selection of minutia types; sending the challenge to the device; receiving an actual response to the challenge from the device, in which: the actual response is computed using an actual key, the actual key is computed using: a deduction of the selection of minutia types from the challenge and actual values of the selection of minutia types; comparing the actual response to the pre-processed responses for a match; and based on whether or not a match was found, validating the combination of the device with the actual values of the selection of minutia types.

In still another embodiment, a system includes a server configured to communicate with a device, in which the server selects at least one type of minutia from a plurality of minutia types; the server forms a challenge that conveys the selection of minutia types; the server computes a plurality of pre-processed responses possible to receive from a valid device, in which: each pre-processed response is computed using a key, each key is computed using values that are possible for the selection of minutia types; the server sends the challenge to the device; the server receives an actual response to the challenge from the device, in which: the actual response is computed using an actual key; the actual key is computed using: a deduction of the selection of minutia types from the challenge and actual values of the selection of minutia types; the server compares the actual response to the pre-processed responses for a match; and based on whether or not a match was found, the server validates the combination of the device with the actual values of the selection of minutia types.

In yet another embodiment, a computer program product includes a non-transitory computer readable medium having computer readable and executable code for instructing a processor to perform a method, the method including: selecting at least one type of minutia from a plurality of minutia types; forming a challenge that conveys the selection of minutia types; computing a plurality of pre-processed responses possible to receive from a valid device, in which: each pre-processed response is computed using a key and each key is computed using values that are possible for the selection of minutia types; sending the challenge to the device; receiving an actual response to the challenge from the device, in which: the actual response is computed using an actual key, the actual key is computed using: a deduction of the selection of minutia types from the challenge and actual values of the selection of minutia types; comparing the actual response to the pre-processed responses for a match; and based on whether or not a match was found, validating the combination of the device with the actual values of the selection of minutia types.

BRIEF DESCRIPTION OF THE DRAWINGS

FIG. 2, comprising FIG. 2A and FIG. 2B, is a system diagram illustrating a challenge, response and validation process performed by the system of FIG. 1 in accordance with an embodiment;

FIG. 6, comprising FIG. 6A and FIG. 6B, is a system process flow diagram illustrating a system for validation scoring, confidence rating and step-up authentication processing in accordance with an embodiment;

DETAILED DESCRIPTION

Figure 1:
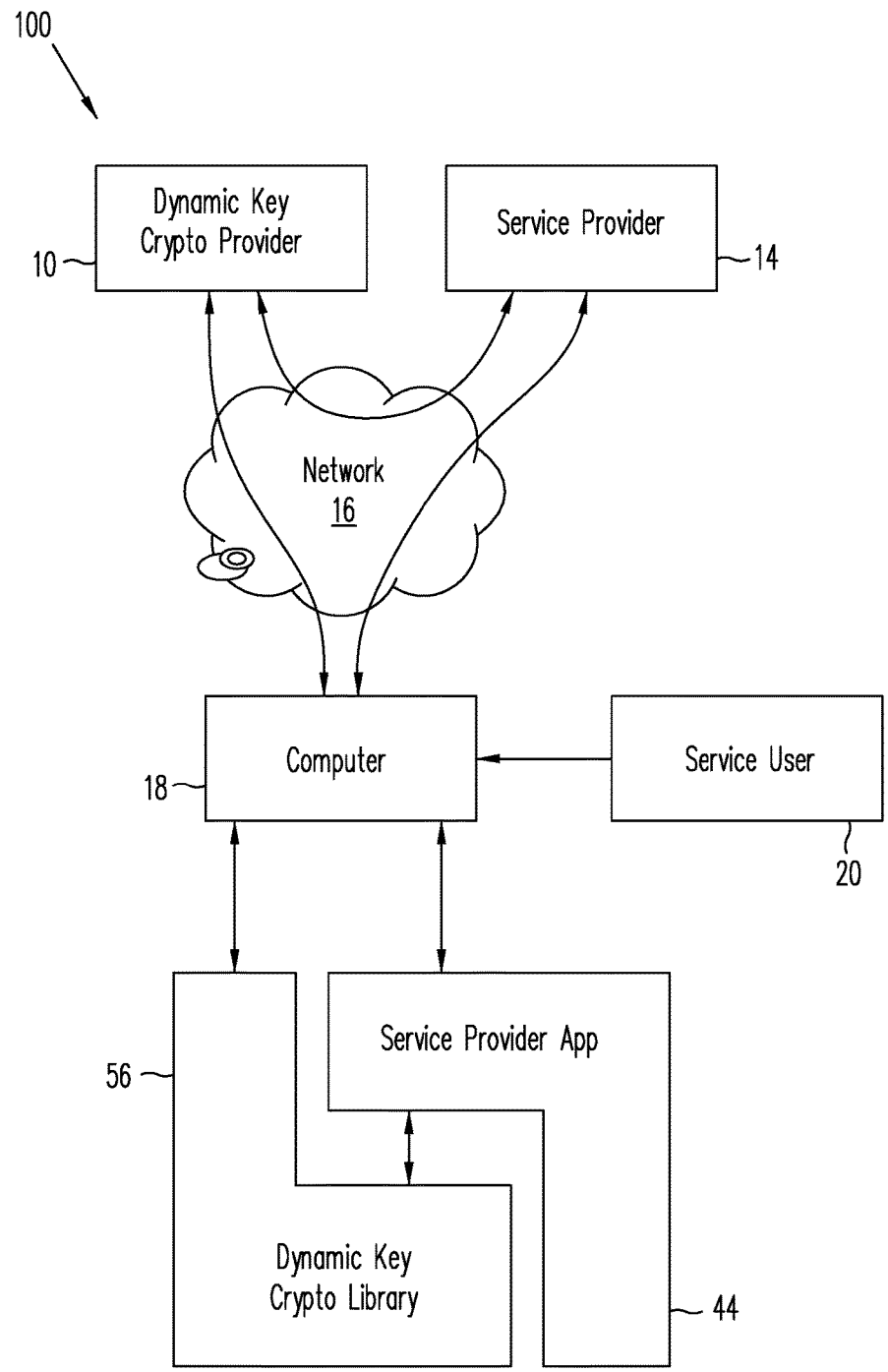
FIG. 1 is a system diagram illustrating communication and security between a client, a client device and a service provider facilitated by a dynamic key cryptography provider in accordance with one or more embodiments.

In accordance with embodiments of the present invention, methods and systems of dynamic key cryptography using dynamically changing keys composed of or derived from dynamically changing key material provide cryptographic services such as authentication, data protection, and digital signature by uniquely identifying a user's computer or other electronic device based on (1) the electronic device itself, e.g., a mobile phone or personal computing device, and using a very wide range of hardware, firmware, and software minutia found on the computer; (2) secrets a user of the computer knows; and (3) biometric information the computer might collect from the user. Dynamic key cryptography in accordance with one or more embodiments enables secured actions for users of electronic computers and, more particularly, provides authentication between a client electronic computer and a service provider, encryption of data electronically stored or sent on a communication channel, and digital signature for electronic digests of actions performed by the user on an electronic computer.

The dynamic key cryptography system according to one embodiment anticipates changes to the minutia caused by updates and natural usage of the computer and practically eliminates false negatives that block valid users from a network service. Dynamic key cryptography may provide a safe, reliable method to users of network services for authenticating the user to network services that protects both the user and the network services, protects the integrity and privacy of data, and provides for digitally signing the digest of an action performed by the user on the electronic computer.

One or more embodiments may provide features such as: 1) simple user experience—no difficult passwords to remember or type, the user device or computer is invisibly authenticated and the user can be asked to enter a second identity factor such as a secret PIN or biometric (e.g., voiceprint) into the computer only if required by the service and protected services can be automatically reconnected to a new device or computer when it is registered by the user; 2) unprecedented security—using a wider range of hardware, firmware, software, secret and biometric minutia to deliver a very accurate device or computer and user identity that is more difficult to spoof, especially as some computer identifier values are not static but are expected to change; 3) reliability—anticipating changes to the user device or computer delivers a tolerant, yet secure authentication with fewer false negatives that anger users and clog customer support services; and 4) service and data separation—delivered as an integrated part of a mobile application (app), a "foundation" (e.g., dynamic key cryptographic service) helps protect the app, encrypt service data stored on the user device or computer, digitally sign actions and allows the service to react without affecting other services, e.g., should data need to be wiped, only the app's data is affected, not the user's other information such as the user's pictures or messages.

One or more embodiments may enable a more convenient method for connecting the user and service. For example, instead of subscribers typing in cumbersome passwords (or worse yet, storing them unencrypted on the computer), the dynamic key cryptographic (dynamic key crypto) service and related client software can compute and manage the unique properties of the user device or computer. The resultant identified computer can be used in place of passwords to simplify the customer connection experience. Since the computer itself is uniquely identified, it represents a safer method of identifying customers (e.g., users or subscribers). By forming cryptographic keys which use minutia found on the computer, the computer itself (as defined by its minutia) is validated, not a static key stored or intended to be stored only on the computer. The discovery and copying of a single value (the secret key) is significantly easier than the discovery and copying of a very large range of computer minutia values. In addition, the writing of a single key in a computer's memory effectively counterfeits the uniqueness of a computer identified by a single, static stored value. To counterfeit a dynamic key crypto-identified computer, it would be necessary to intercept various methods to learn the minutiae values of the computer. Several direct and related methods may exist for learning the value of a particular computer minutia; to effectively counterfeit the computer, it may be that all methods for accessing all computer minutia values would need to be intercepted and the fraudulent response returned. Furthermore, since the dynamic key crypto system expects certain computer minutia values to change, a successfully counterfeited computer would also need to ensure the fraudulent computer minutia values change in an expected manner. Should a user's online activities require an even higher level of trust, the platform (e.g., dynamic key crypto service and related client software) can force the user to enter the user's standard PIN into the computer to ensure a valid user is the person using the computer.

Several technologies exist for processing security and assurance claims using static values. These include passwords themselves and static 'seed keys' for functions like one-time-password and challenge-respond security mechanisms. Even public key cryptography is based off a static key pair (public and private). One or more embodiments of the dynamic key crypto system may use a very large numeric representation (e.g., 100,000's of bits) of computer and user minutia (e.g., any piece of information that can be definitively associated with the computer and its user, including information from the general categories of what the user or computing device has, what the user knows, and what the user is) to form cryptographic keys that support a range of security functions in a verifiable manner (a cornerstone of security). In one or more embodiments methods based on the predictable dynamic nature of the minutia may allow for verification of the minutia (as if they were a single static value) but not all of the minutia is required to be static; most values of the minutia can (and are expected to) change and evolve over time and the change of the minutia values themselves increases the perceived randomness of the resultant dynamic crypto keys. The validation of dynamic key cryptography based on changing minutia uses a complex confidence scoring which isolates and evaluates the minutiae that have changed and uses confidence weightings against the predictability of such changes. Changing minutia when used as dynamic key material for dynamic key cryptography adds complexity to the cryptographic system which can improve security as a one-time copy of the minutia values or resultant key will likely fail later in time as the minutia values are expected to change.

Layering static minutia (e.g., hardware minutia, user secrets, some user biometrics), slow-changing minutia (e.g., firmware minutia, some user biometrics), and predictably changing minutia (e.g., software minutia) can create a very large set of key material (or keyspace) which can be processed as subsets of minutia. These subsets of minutia function as static keys over a particular time interval and provide increased security while being fault-tolerant to normal and natural anomalies. Examples of categories of minutia include various hardware, firmware, software, user secrets, and user biometric values. For example, hardware minutia may include the make and model of the computing device (e.g., smart phone or pad), an international mobile equipment identification (IMEI) number of the computing device, or a circuit manufacturer's ID number which may be readable from a circuit chip element of the computing device. Similarly, examples of firmware and software minutia may include which firmware and software codes are installed on the computing device and characteristics such as what particular version or release date of firmware or software are installed on the computing device. Other minutia may include such information as geo-location from GPS (global positioning system) capability of the computing device. In some embodiments, minutia may also include secrets a user of the computing device knows (e.g., a PIN number or password) or biometric information the computing device might collect from the user (e.g., a fingerprint, voiceprint, or retinal scan). In this manner, dynamic key cryptography can utilize minutia values from the three identity factors ("have", "know", and "are") to form a dynamic key so that dynamic key crypto purposes such as authentication, data protection, and digital signature can benefit from the three identity factors simultaneously.

Dynamic key cryptography key matter is a significant improvement over static cryptographic keys of simply random numbers (as nearly all prior art cryptography uses). Dynamic key crypto keys are permutations of a very large collection of minutia values, many of which change over time; the result is a seemingly random number comprised of independently meaningful minutia values.

To achieve fault tolerance over a possibly changing set of minutia, anticipated changes to minutia and multiple subsets of minutia that provide back-up to any single subset can be used. By using mass produced electronic devices (e.g., mobile units and computers) which contain both a vast array of minutia and predictable evolution paths of minutia, a dynamic encryption system of methods based on evolving minutia can be maintained for the benefit of nearly any security function. In addition, since the range of minutia is so large, certain cryptographic functions can be performed several times using different subsets of minutia. In this manner, should one subset of minutia change, cryptographic checks using other minutia subsets and the anticipated changes to the minutia can improve fault tolerance and detection of spoofed minutia values.

Assertions regarding a computer's uniqueness, confidence in the computer's uniqueness, and service-orientated directives (e.g., provision, lock-hold, erase, transfer, blacklist) are formulated, controlled, and directed by the dynamic key crypto service. For example, computer dynamic key crypto libraries (installed on various user devices) gather the computer minutia values (e.g., from various user devices) and act on the computer (selected one of the various user devices) in response to dynamic key crypto service directives. The heuristics for the predictive and constantly changing minutia values are performed in the dynamic key crypto service using data forwarded by the dynamic key crypto libraries (from the various user devices) in addition to data gleaned from industry sources. Industry data includes cataloguing publically available data (such as over-the-air upgrades—including operating system (OS), firmware, and applications—and network updates) over the range of possible computers. While nearly infinitely larger than the changes that can occur to a single computer (lending security via a broader search space) the industry data is still finite and, therefore, useful in predictive heuristics regarding computers in use.

Various embodiments may provide systems and methods for secure dynamic key cryptography services including:

1) Registering online service providers (OSP) with the dynamic key crypto service to create custom (for each OSP) computer dynamic key crypto libraries that conduct security functions but are resistant to successful attacks by other services and prohibit collaborating online service providers from profiling users.

2) Collecting and registering the minutia values with the dynamic key crypto system, tying the minutiae to an online service provider account identifier.

3) Gathering industry information regarding updates to computer hardware, firmware and software to create a catalogue of industry minutia values which may possibly appear on registered computers when they are updated. The catalogued industry minutia values are indexed and the possible minutia and current minutia are combined and permutations intelligently stored to anticipate future minutia possibilities.

4) Identification based on a hash from a subset of minutia taken from a very wide range of minutia found or collected by the computer including hardware, firmware, software, user secrets, and user biometrics. The authentication can be performed as an intelligent challenge and response which indexes minutiae and, when compared to possible responses from anticipated minutiae, can ascertain minutia changes without having to actually exchange the minutiae between the computer and dynamic key crypto services.

5) Scoring the confidence of a valid response based on the minutia used, the anticipated and expected changes to the minutia used including non-computer factors such as user PIN entry, geo-location, and biometrics. Different minutia can be intelligently chosen for the challenge to achieve a response that yields a higher confidence score, increased computer uniqueness, multiple identity factors, and particular minutia isolation.

6) Protecting the application and data running on a computer by using the minutia in cryptographic functions such as encrypted memory, local identification, and heartbeat to prohibit application self-destruction. Some cryptographic functions are computed using more than one subset of minutia to allow back-up functionality should minutia used in the cryptographic function change. The high number of meaningful minutia enables a more complex interaction between the user, the computer, and the software computing the identifier. The increased "chatter", a mix of meaningful and decoy reads of minutia, obscure which minutia is meaningful, and thereby increases the difficulty of spoofing minutia values and intercepting calls intended to counterfeit the original computer.

7) Digitally signing a digest of an action performed by the user on the computer by ciphering the message digest with a key formed by minutia values which can include the three factors of identity ("have", "know", and "are", e.g., respectively, computer or device, user secret, user biometric information).

8) Notifying a wide range of online service providers should a computer status change. This enables a single event to trigger responses from a wide range of registered online service providers so that security and service continuity are maintained.

9) Forcing a user to enter a service PIN, computer PIN or biometric on a registered computer to include user minutia in the dynamic key cryptography function and ensure that a valid user is controlling an identified computer.

Some embodiments of systems and methods allow the calculation of one or more minutia value subsets to be based on a very wide possible range of minutia from various categories including hardware, firmware, software, user secrets, and user biometrics. One embodiment models predictive and anticipated changes that occur naturally and during the use of a computer or device. The larger considered ranges of minutia found on a computer or collected by a computer and the modeled dynamic nature of some minutiae enable a more robust and secure authentication system which is less prone to spoofing.

One embodiment uses a computer identity provider service to collect computer minutia information from the industry and uses this data to anticipate possible changes and permutations to minutiae on registered computers. By anticipating changes in minutiae found on the hardware, firmware, and software elements of a computer, embodiments are more fault-tolerant to natural changes in the computer. In this manner, embodiments can anticipate changes to minutiae and, through a challenge and response exchange between a computer and dynamic key crypto service, synchronize changes to minutiae without actually exchanging the minutiae between the computer and dynamic key crypto service.

Since nearly all security functions such as authentication, encryption, and digital signature are based on static keys and identifiers, embodiments of the present systems and methods also allow for the in-system back up of some cryptographic functions and secure transmission, synchronization, and updating of dynamically changing minutiae between the computer and the dynamic key crypto service. The dynamic key crypto service and computer enable the dynamically changing minutiae to be used in or used in place of traditionally static security functions including authentication, encryption, digital rights management, and data protection.

FIG. 1 illustrates a system 100 in which a service user 20 may communicate through a network 16 (e.g., the Internet, local area networks (wired and wireless), and personal networks (e.g., P2P, Bluetooth, near field communications (NFC)) using a computer 18 (e.g., a mobile phone, computer system, smart phones, laptops, tablets, sensors, payment terminals, and meters or any other communication capable electronic computer). The computer 18 (also referred to as "electronic device", "user device", or simply "device") may operate by executing an operating system (OS) that may enable execution on computer 18 of a dynamic key crypto library 56 and a service provider app 44. Service provider app 44 may be provided by one or more of a number of various OSPs and may provide features specific to a particular service provider 14 that provides the service provider app 44 to the service user 20 and user computer 18. As shown in FIG. 1, service provider app 44 may interface with dynamic key crypto library 56, and both service provider app 44 and dynamic key crypto library 56 may interface with computer 18 and its operating system. Service user 20 may communicate with service provider 14 over the network 16 using computer 18, for example, using service provider app 44. A service user 20 may be a person that can have several different types of computer 18 and may be a user of any number of service provider systems 14. Likewise, a computer 18 may be used by more than one service user 20, for example, family members sharing a smartphone or pad.

A dynamic key crypto provider 10 may provide various services and functions related to minutiae found on the computer 18 or minutiae collected by the computer 18 from the service user 20. The dynamic key crypto provider 10 may be a web service capable of securely manipulating and analyzing large amounts of data such as performing calculations, data modeling, permutation processing, interpolation, internet searches and complex database functions. The dynamic key crypto provider 10 may be cloud-based so it can have sufficient computational speed and power to off-load intensive computational efforts from a sometimes resource-constrained computer 18. The dynamic key crypto provider 10 may provide a secured processing environment for the processing in some embodiments including managing an enormous data-intensive query engine for complex data pattern matching, modeling and processing of complex and numerous permutations. As shown in FIG. 1, dynamic key crypto library 56 may communicate with dynamic key crypto provider 10 and may also communicate with the service provider 14 through Network 16. Dynamic key crypto provider 10 also may communicate with online service providers via network 16 and may communicate with the particular service provider 14 that provides the service provider app 44 to the service user 20 and user computer 18. Service provider 14 may have a customer-vendor relationship, for example, with dynamic key crypto provider 10 in which service provider 14 is a customer receiving services from dynamic key crypto provider 10. There can be any number of service provider systems 14 connected to the dynamic key crypto provider 10. The service provider 14 may be an industry typical website usually requiring a username and password. Examples of a service provider 14 include but are not limited to social networking websites, corporate IT services, and online banking, healthcare, and travel services.

Figure 2A:
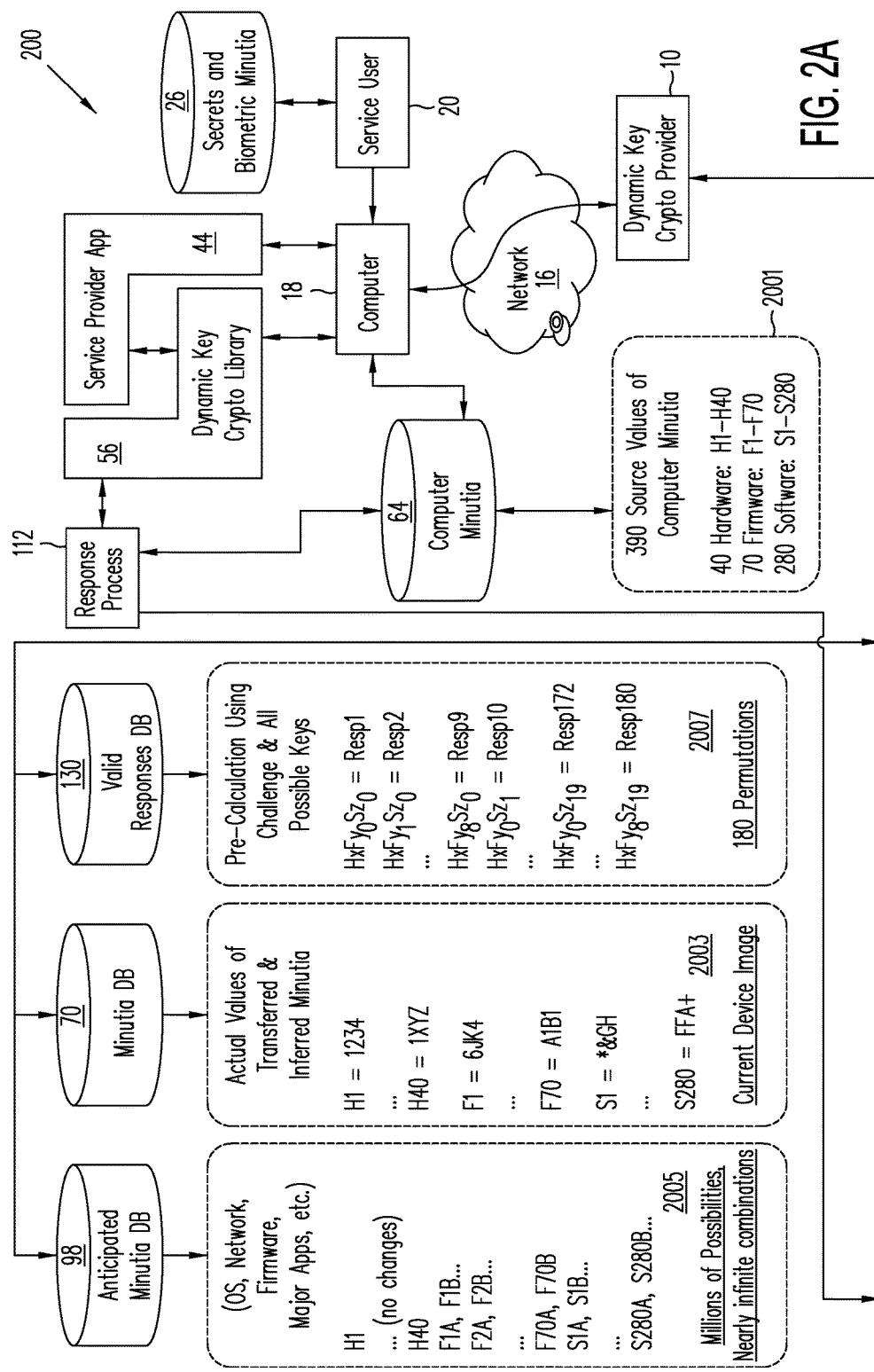

FIG. 2 shows an illustrative example for providing and using dynamic key cryptography to ensure a valid service user 20 is using an authenticated computer 18 in a system such as system 200 shown in FIG. 2. As described in more detail below, system 200 may collect and catalog a number of minutiae values of computer 18 and service user 20 that may be useful for identifying the computer 18 and service user 20 in the sense that computer minutia 64 and secrets and biometric minutia 26 can be used by the dynamic key crypto provider 10 to form dynamic keys unique to each and every distinct computer 18 and service user 20. In other words, each distinct computer 18 may have a method for using unique computer minutia 64 and secrets and biometric minutia 26 in system 200 that corresponds to that distinct computer 18 and service user 20, and each uniquely identified computer 18 corresponds to one and only one distinct computer 18 and each uniquely identified service user 20 may correspond to one and only one distinct service user 20. The unique identification of a computer 18 may be processed by system 100, for example, by a service provider 14 or by the dynamic key crypto provider 10, and there be no meaningful single identifier or identity key itself stored on the computer 18. System 200 shown in FIG. 2, illustrates an example of identifying and authenticating a specific computer 18 and service user 20 via challenge, response and validation sequences performed by dynamic key crypto provider 10. Each distinct computer 18 and service user 20 may be recognized, for example, by specific computer minutia 64, specific secrets and biometric minutia 26, combinations of computer minutia 64, combinations of specific secrets and biometric minutia 26 or combinations of both specific computer minutia 64 and combinations of specific secrets and biometric minutia 26 found on the computer 18 or collected by the computer 18 from the service user 20 as cataloged by the dynamic key crypto provider 10.

Collection of minutia can include methods such as fuzzing and hashing that obfuscate the actual values of minutiae that represents personal identifiable information before the minutiae values are sent from the computer 18 to the dynamic key crypto provider 10 such that the anonymity of a service user 20 is maintained. For example, phone numbers can be hashed so that the actual phone number is not known. In another example, the geo-location home of a service user 20 can be fuzzed by truncating the GPS coordinates so that the value processed by the dynamic key crypto library 56 represents, for example, a multiple mile radius, not multiple feet. In this manner, it would be difficult to determine the exact address a computer 18 resides nearly every night that could be interpolated to be the home of the service user 20. The fuzzy geo-location can be beneficial because the location of the computer 18 can be tracked without invading the privacy of the service user 20 because, to the dynamic key crypto provider, the service user 20 can be anonymous. If a service provider that knows the true identity of a service user 20 were to also know the geo-location of the device, the privacy of the service user 20 could be abused. Thus, a separation of device and user knowledge can exist so that the device (i.e. computer 18) of an anonymous service user 20 can be tracked 24×7 and service providers (who do know the identity of service user 20) can ask for geo-location information from dynamic key crypto provider 10 only when they require it so as to gain benefit of geolocation without a privacy invasion of the service user 20.

As shown in FIG. 2 at step 2001, in one example, computer minutia 64 can represent a set of 390 distinct minutiae values that may be chosen for collecting and cataloging from the computer 18. In the particular example, there are 40 categories or types of the minutia that are hardware minutia; 70 categories or types of the minutia are firmware minutia; and 280 categories or types of the minutia are software minutia. Hardware minutia may include such items as the device manufacturer, model number, serial number, and international mobile equipment identification (IMEI) number, for example. Firmware minutiae may include, for example, the name of the firmware vendor, version number, revision number, revision date, communication and telephony services, location and GPS data, and operating system. Software minutia, similarly for example, may include application name, supplier identification, software release number, memory reads, software cataloguing, clock and other counters, and date. Hardware minutia values typically cannot change without changing a physical component of the computer 18. Firmware minutia can be updated but usually their update is controlled by someone other than the service user 20. Software minutia changes dynamically via various individual instantiations of service user 20 and includes elements that may require predictable, constant change in normal situations (i.e., frequently called contact phone numbers).

It is important to note that software minutiae values can often reflect customizations performed by the service user 20. In this manner, software minutiae values can accurately identify computer 18 devices that are otherwise extremely similar in hardware and firmware. When the computer 18 is manufactured, devices are very similar, hence the need for serial numbers, but, under security considerations, these hardware minutia identifiers are few in number and can be easily spoofed. Significant customization affecting software minutiae values is typically done within days, even hours, of ownership of a computer 18 by the service user 20. Thus the software minutiae values diverge significantly at device personalization and the addressable space continues to expand throughout the use of the computer 18 by the service user 20. Therefore, the uniqueness of a computer 18 increases with time after manufacturing, this is often referred to as entropy, or the natural tendency towards chaos, and, thus, software minutiae are valuable in the security of dynamic key cryptography functions. To illustrate the potential range represented by the values of minutia if, for example, there were 300 minutia values each averaging four bytes in length, by interleaving and mixing the minutia values to form dynamic crypto keys, the keys could represent a space defined by as 2 raised to the $9600^{th}$ power (cryptographic keys of 2 raised to the 1024 power are considered secure by the industry).

Nearly any data can be introduced into the system 200 by the definition and addition of minutia classes. For example, PIN, password, service history and other service user 20 secrets can be entered and processed as if they were a class of minutia. For example, a minutia index might refer to memory location where the minutia value could be read and processed. If the minutia index for the PIN is sent to the device, instead of, for example, reading a memory location, a PIN screen can be displayed on the computer 18, the service user 20 can enter their PIN (or other secret value) and the information entered can be processed as the minutia value in the method here described by system 200. A similar process can be performed for biometric values, for example, facial geometry, voice patterns, fingerprinting. In another example, the service provider app 44 might be analyzed and the software structure itself provide minutiae values that can be challenged and validated to ensure the run-time integrity of the calling application service provider app 44. Thus by adding minutia classes, any information can be processed to get the benefits of system 200 (e.g., secure input for crypto key material, fuzzy validation matching, inferred minutia value learning, confidence rating).

Step 2003 shows an example of specific values of the minutia 70 database for a specific computer 18. The minutiae can be obtained via the dynamic key crypto library 56. Various instances of the dynamic key crypto library can exist on a single computer 18 and can be related to one or more instances and providers of a service provider app 44. In this example, the first hardware minutia (H1) may be the IMEI number of computer 18, and for the specific computer 18 of the example, the IMEI number may be encoded as "1234". The computer 18 may have specific values for the 40 different hardware minutia, H1 to H40; specific values for 70 different firmware minutia, F1 to F70; 280 specific values for different software minutia, S1 to S280, 2 specific values for service user 20 secrets, ?1 and ?2; and 5 specific values for service user 20 biometric minutia, B1 to B5, from which it may be possible to accurately and uniquely identify the specific computer 18 and associated service user 20 for computer 18. The actual minutia used and their index ordering as H1 to H40, F1 to F70, S1 to S280, ?1 to ?2, and B1 to B5 provide a particular cataloging scheme or a cataloging of minutia DB 70 for the specific example illustrated in FIG. 2. The combination of specific hardware, firmware, software, secret and biometric values found on the computer 18 and collected from the service user 20 at a particular time or within some pre-defined time frame may be referred to as the "current device image" as indicated at step 2003.

For a particular computer 18 and a particular scheme (e.g., H1 to H40, F1 to F70, S1 to S280, ?1 to ?2, and B1 to B5 of FIG. 2) a number of possibilities for specific values of the minutia can actually occur on the computer 18, be known by the service user 20 or represent the biometrics of service user 20. For example, as indicated at step 2005, the specific minutia value for index F1 may be either of F1A, F1B, or possibly others, referred to as the anticipated minutia DB 98. All other computer minutia values remaining the same, a change at the F1 index from a value of F1A to F1B, for example, represents one permutation of computer minutia possible for a specific type of computer 18 (e.g., for computers running the Android operating system). It can be seen that if five different values were possible at index F1, then 5 permutations that change only F1 may be possible for each different combination of the remaining computer minutia. Although all 5 values of F1 may not be possible for every combination, the number of permutations is generally multiplicative so that an estimate of the number of possible permutations can be made by multiplying together the number of possible values at each index, for all the indexes H1 to H40, F1 to F70, S1 to S280, ?1 to ?2, and B1 to B5. For the example shown in FIG. 2, it can be seen that even with only 2 or 3 values of possibility for each index, the number of permutations, or different possible combinations of minutia, for all types of computer 18 can easily be practically infinite. Thus, even for large numbers of computer 18 that appear otherwise identical, within the millions of different possible combinations of minutia DB 70 and the related practically infinite range of minutia values in the anticipated minutia DB 98, each single computer 18 can be uniquely identified by matching its unique computer minutia 64 and secrets and biometric minutia 26 collected by computer 18. As an example, when a service user 20 receives a newly manufactured mobile device (i.e. computer 18), typically part of the out-of-the-box initialization routine is to customize the computer 18 with service user 20 specific information such as, for example, contacts, email and network connections. The customizations these additions represent (i.e minutia) can immediately differentiate two examples of computer 18 that were manufactured one immediately after the other. As the service user 20 uses their computer 18, the usage continues to affect and differentiate the minutiae that can be collected from the computer 18 (e.g., frequently called phone numbers). By maintaining a database of all industry updates related to the collective industry of instances of computer 18—e.g., by collecting and cataloging all industry updates to hardware, firmware, and software minutia—dynamic key crypto provider 10, for example, may be able to know what all the possibilities are for the computer minutia 64 of a given computer 18 so that system 200 may be able to recognize a computer 18 in spite of changes not reflected or known by the current minutia DB 70. In fact system 200 may improve the accuracy and fault tolerance of its recognition of devices (i.e. computer 18, computer minutia 64, service user 20 and secrets and biometric minutia 26) by exploiting knowledge of changes (i.e. anticipated minutia DB 98) to the current device image (i.e. minutia DB 78).

When using combinations of computer minutia 64 for identifying a specific computer 18, system 200 may use intelligent minutia selection 114 to select a combination of minutia from the total set of minutia (i.e. computer minutia 64 and secrets and biometric minutia 26). In the specific method 2010 example illustrated in FIG. 2, the combination of minutia chosen is one hardware minutia, Hx, one firmware minutia, Fy, and one software minutia Sz. Such a combination may be referred to as a "triplet". Although a triplet Hx-Fy-Sz may include one hardware, one firmware, and one software minutia as in the example illustrated in FIG. 2, a triplet could also include, for example, two hardware minutiae and one software minutia, e.g., Hx-Hy-Sz. Also, for example, more or less than three minutiae could be used at a time, e.g., a "quadruplet" such as Hx-Fy-Sz-Bb. Any combination of minutia from the total set of minutia DB 70 may be used. Smaller subsets of minutia values constrain the scope of change within the minutia values so the results can be rapidly validated. Longer subsets of minutia values increase the potential change (and therefore security) and can be useful in infrequent, but high security crypto actions like digital signature.

The particular values for x, y, and z are not specified for this example so that Hx could be any one of the 40 hardware minutia H1-H40 shown in step 2003, e.g., IMEI number. Similarly, Fy could be any one of the 70 firmware minutia, and Sz could be any one of the 280 software minutia shown, for example, in step 2003. A hardware minutia of a particular computer 18 generally will not change without changing the entire computer 18 (and identity) itself, so whatever hardware minutia, Hx, is used, it may not be expected to change for the particular computer 18 being challenged, as indicated by "(no changes)" next to H1-H40 in step 2005, so that the number of possibilities for each individual Hx is limited to one. In the particular example illustrated in method 2030 of FIG. 2, the firmware minutia, Fy, is assumed to have nine different acceptable values for illustration, and the software minutia, Sz, is assumed to have twenty different acceptable values for illustration. Method 2030 can vary the fault tolerance of the invention by varying the allowable range of acceptable minutia values with respect to the range of possible minutia values for each minutia value.

Although it may be the case that certain combinations of hardware, firmware, and software values may be incompatible (e.g., a particular software update might require a particular firmware update) the example of FIG. 2 assumes that all updates are independent so that the total number of permutations of acceptable device characteristic values for the particular computer 18 being challenged is the product of the number of acceptable possibilities for each component, Hx, Fy, Sz, of the triplet Hx-Fy-Sz, or 1*9*20=180, as indicated at step 2007. The number of acceptable permutations for a selected combination of minutia, then, can be smaller than the number of possible permutations for the same triplet and significantly smaller than the total number of permutations for all minutiae, as shown by this example, e.g., 180 out of potentially millions of possible minutia values and 180 out of the potentially infinite number of permutations as indicated at step 2005.

Selection of the particular combination of minutia (e.g., Hx, Fy, Sz for the example of FIG. 2) to be used for challenging a particular device may vary, not only from computer 18 to computer 18 and service provider 14 to service provider 14, but, for example, each time the same computer 18 is challenged on behalf of the same service provider 14. The intelligent minutia selection 114 may employ a number of considerations in selecting the combination of minutia to be used for a particular challenge of a particular computer 18 and service user 20. As shown step 2010, intelligent selection of the combination of minutia (e.g., Hx, Fy, Sz for the example) may be based on need for uniqueness, predictability and scope of possible changes. For example, selection of minutia may use expectations for changes to the current minutia DB 70 database based on knowledge of the current computer minutia 64, current secrets and biometric minutia 26 and knowledge of all minutia value updates that can occur (i.e. anticipated minutia DB). Knowledge of all minutia value updates that can occur, whether or not the updates actually have occurred, can be gained from the previously mentioned collecting and cataloging industry-wide of all computer minutia updates and the heuristically determined trends caused by the use of computer 18 by a particular service user 20. Also, for example, if uniqueness and predictability are of concern, minutiae may be chosen for which the values are known and are not expected to change. If scope of possible changes is of concern, minutiae with a reduced capacity for change or a tighter tolerance of acceptable change may be selected. Combinations of minutiae can be selected to isolate a particular minutia by combining it with static minutiae. Likewise, a static minutia can be grouped with minutia that changes rapidly to form a set that changes in some manner to protect static minutia members. Minutia sets can be selected to address specific purposes such as geo-location or user secrets. Minutia sets can combine minutia from the various identity factors of something you have, something you know and something you are. Minutia values can be selected to periodically 'refresh' validations of specific minutiae.

The intelligent minutia selection 114 process can select minutiae from the different minutia sources of hardware, firmware, software, user secrets and user biometrics. The intelligent minutia selection 114 process chooses the minutia nearly randomly to widely and unpredictably sample various computer minutia 64 and secrets and biometric minutia 26 such that deducing a pattern for minutia sampling is difficult to infer. However, there may be certain minutia pairings and groupings that readily show and determine changes to computer minutia 64. In such cases, a 'selected' (versus 'random') subset of minutiae may be selected by the intelligent minutia selection 114 process.

After the intelligent minutia selection 114 process determines the minutiae to be used, the formulate challenge 116 process looks up the minutia index for that minutia from the SP info and IDs 32 database; this allows the minutia index for one service provider 14 to be different from another service provider 14. The indexes are then combined with a random number using an algorithm defined for each service provider (as described in FIG. 3, specifically the SP info and IDs 32 database); again to provide differentiation and security between service provider 14 instances. The challenge result from the formulate challenge 116 process can then be processed at step 2020 and given to the send challenge and await response 118 process. Since the challenge contains nearly random information which serves as the actual challenge value, the transmission of the challenge need not be done via an encrypted tunnel but it can be sent securely by send challenge and await response 118 if desired.

As shown at step 2020, the formulate challenge 116 process can compute a cryptographic key based on the selected combination of minutia (e.g., Hx-Fy-Sz for the illustrated example). For example, each of x, y, and z may be a table index value (e.g., an integer) to the corresponding hardware (H), Firmware (F) and Software (S) information in a database of the particular service provider 14. The specific x, y and z table ordering and properties for a particular service provider 14 is found both in the dynamic key crypto library 56 created specifically for the service provider 14 and in a database of information specific to the service provider 14 maintained by the dynamic key crypto provider 10. The key may be computed as shown at step 2020, for example, by applying a mathematical or cryptographic function "Fn" to the combination of minutia values Hx+Fy+Sz. Thus, the cryptographic key may cryptographically encode information from the selected combination of minutia, e.g., triplet Hx-Fy-Sz. The same minutiae references, for example the x, y and z table indexes, can be computed by applying a mathematical or cryptographic function "Fn", which may be the same or a different function from that used earlier, to form a challenge value combining the indexes with other information such a random number, as used in the example. Thus, the challenge cryptographically encodes enough information for the computer 18 being challenged to determine which minutia should be used in computing its actual response. It is important to note, however, that even though the computer 18 may use the minutiae Hx-Fy-Sz and its own actual values for those minutiae in computing its response, no information as to what are the actual values of the minutiae is included in the challenge or response nor is directly gleanable from the response.

At step 2030, the dynamic key crypto provider 10 computes all responses that are acceptable for the computer 10 to make. The acceptable response computations can be based on the allowable range of possible changes to the defined subset of minutiae selected for the challenge. These computations can be performed beforehand (e.g., independently—whether prior, concurrently, or after—receiving the actual response from the computer 18) and stored in valid responses DB 130 for comparison to the actual response from computer 18. The challenge may be sent by dynamic key crypto provider 10 or by the service provider 14 to the particular computer 18 being challenged. The range of possible changes may be processed because of the constant and continuous collecting and cataloging of industry updates for the total set of minutia from which the particular combination of minutia (e.g., Hx, Fy, Sz for the example of FIG. 2) to be used for challenging the particular device is selected. Because every allowable response to a challenge is therefore known (e.g., computed at step 2030) before the challenge is sent to the computer 18, the actual response that will be received from the computer 18 to the challenge may be among the range of pre-processed acceptable responses (and therefore among the acceptable changes) computed by the dynamic key crypto provider 10 that is challenging the computer 18. As illustrated at step 2030, in this particular example having no possible changes for hardware (e.g., one possible value), nine possible changes or values for firmware and twenty possible changes for software, there are 180 allowable responses for the computer 18 to return to the challenge. Each of the 180 allowable responses may be calculated by the dynamic key crypto provider 10 in a similar manner that the computer 18 will compute its actual response in response process 112, as illustrated in step 2040.

At step 2040, the particular computer 18 being challenged may receive the challenge and unpack the challenge to determine which minutia it should collect and use the values of to form its response to the challenge. Having unpacked the challenge using information and algorithms stored in the dynamic key crypto library 56, the response process 112 can use the computer 18 to fetch the values of the selected computer minutia 64 or collect the values of selected service and biometrics minutia 26 and build a key that may be identical to the key computed by the dynamic key crypto provider 10 at step 2020. The particular computer 18 being challenged may form a response to the challenge by applying a mathematical or cryptographic function "Fn", which should be the same as that used at step 2020 or step 2030, to the key+challenge as shown in FIG. 2. The computer 18 being challenged may then communicate the response to return it directly to the dynamic key crypto provider 10 or indirectly via the service provider 14. Again, since the challenge and response exchange may contain a random number element, it can change every time, even if the same minutiae were selected. As such, it does not need to be securely transmitted between computer 18 and dynamic key crypto provider 10 over network 16, but it can be if desired. The dynamic key crypto provider 10 sends the computer 18 response to the validate response from computer 120 process for processing in step 2050.

As illustrated at step 2050, the validate response from computer 120 process can therefore be determined by simply comparing the actual response received from the computer 18 to the allowable responses that are pre-processed by the dynamic key crypto provider 10 to determine if there is a match. Decrypting or decoding of a response is not necessary so the validation can occur very quickly. On a match between the actual response and one of the pre-processed responses, the validate response from computer 120 process may then know what the particular actual minutia values from computer 18 are for the combination selected (e.g., triplet Hx–Fy–Sz) by knowing which possible response has matched the actual response even though neither response contains any direct or decipherable information about the actual minutia values. If a match is found, the subset of minutiae used in the challenge may be regarded as being known or authenticated. For example, as seen at step 2007, if the actual response matches the 172nd possible response "Resp172" or permutation, then the actual device values must match those of Hx, the first possibility for Fy (e.g., Fy0), and the twentieth possibility for Sz (e.g., Sz19) even though "Resp172" itself contains no direct information regarding the actual minutia values being challenged.

The validate response from computer 120 process can use logical groupings of minutia values to increase the confidence of a matched response. Groupings of related minutia may be gleaned, for example, from the anticipated minutia DB 98 or discovered heuristically. For example, if a set of minutiae is only changed via an industry update and all minutiae within the set change to unique values in unison with the particular update, then should a particular minutia value or values within the set of update related minutia not share the expected values of other minutiae with regard to a single update set, then the validate response from computer 120 could deduce the response related to the minutiae values within the update logical grouping may be in error or fraudulent. As an example, should a fraudulent entity alter the computer 18 to return falsified information when the minutia value is collected by the response process 112 via the operating system on computer 18, the actual minutia value would not be returned. In this manner, a fraudulent entity could make one computer 18 look like another computer 18 or make one service user 20 appear as another service user 20. The validate response from computer 120 can use logical groupings of minutiae and, for example, employ multiple methods for collecting what should be the same value (i.e. a smartphone's phone number can be learned through several methods) (1) Often, multiple methods exist for reading a particular value such as phone number. The various methods can be used and the returned minutia value compared for consistency. (2) Often groups of minutia values are related such that a change in one should create changes elsewhere (for example time and time zone.) In the validate response from computer 120 process, the minutia values related to one another can be verified to ensure changes are found to be consistent throughout the related 'group' of minutia values.

Even if an exact match is not found, the allowable ranges from the set of possible minutiae may be expanded or additional challenges using other, possibly related, minutiae may be sent to the device in an effort to validate the device.

Figure 4:
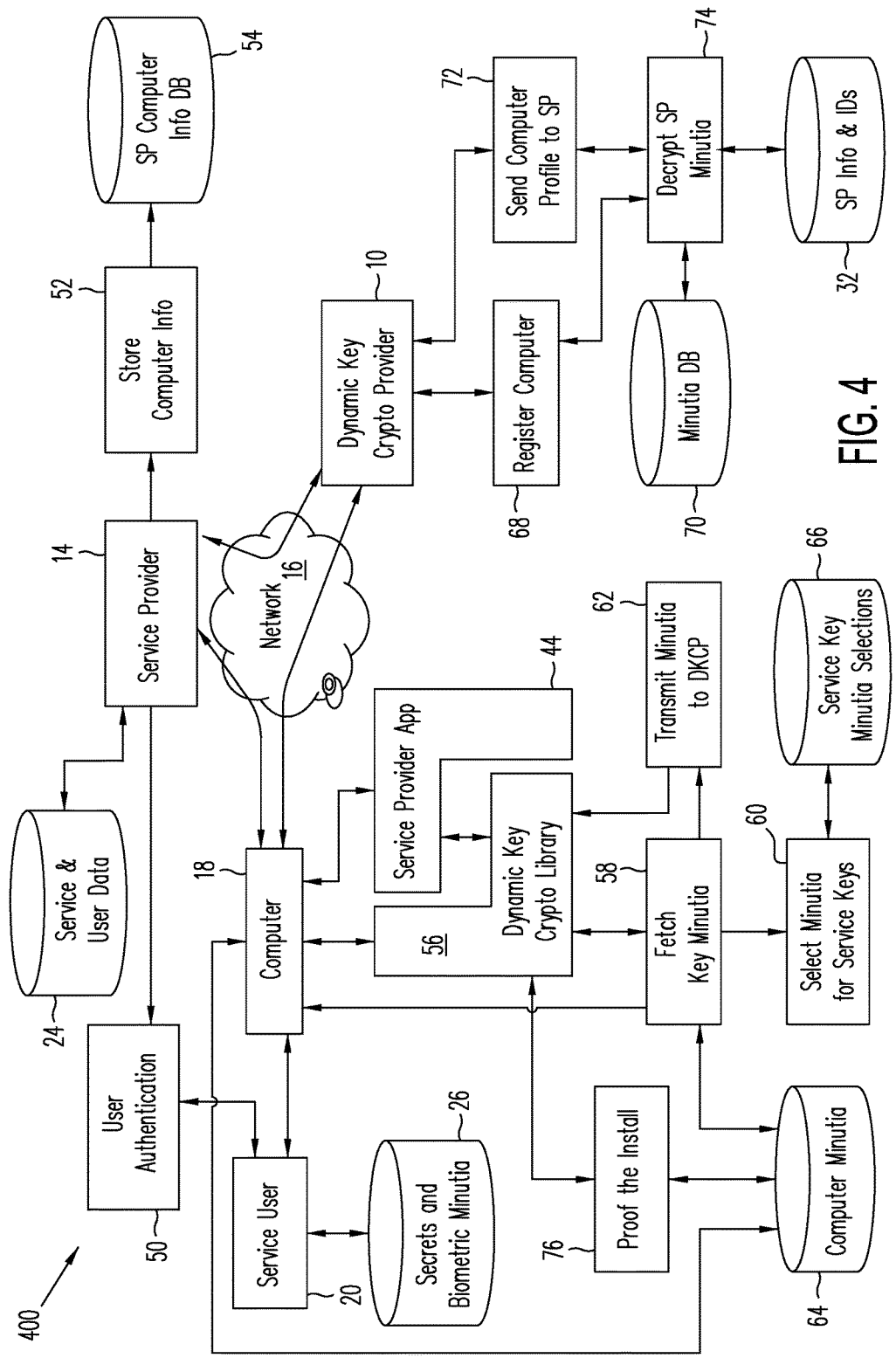
FIG. 4 is a system process flow diagram illustrating a system for registration of computer system and user minutiae and services in accordance with an embodiment.

If necessary, changes in the computer minutia 64 of a computer 18 can be sent from the computer 18 to the dynamic key crypto provider 10 using the registration subsystem 400 described in FIG. 4.

Figure 6A:
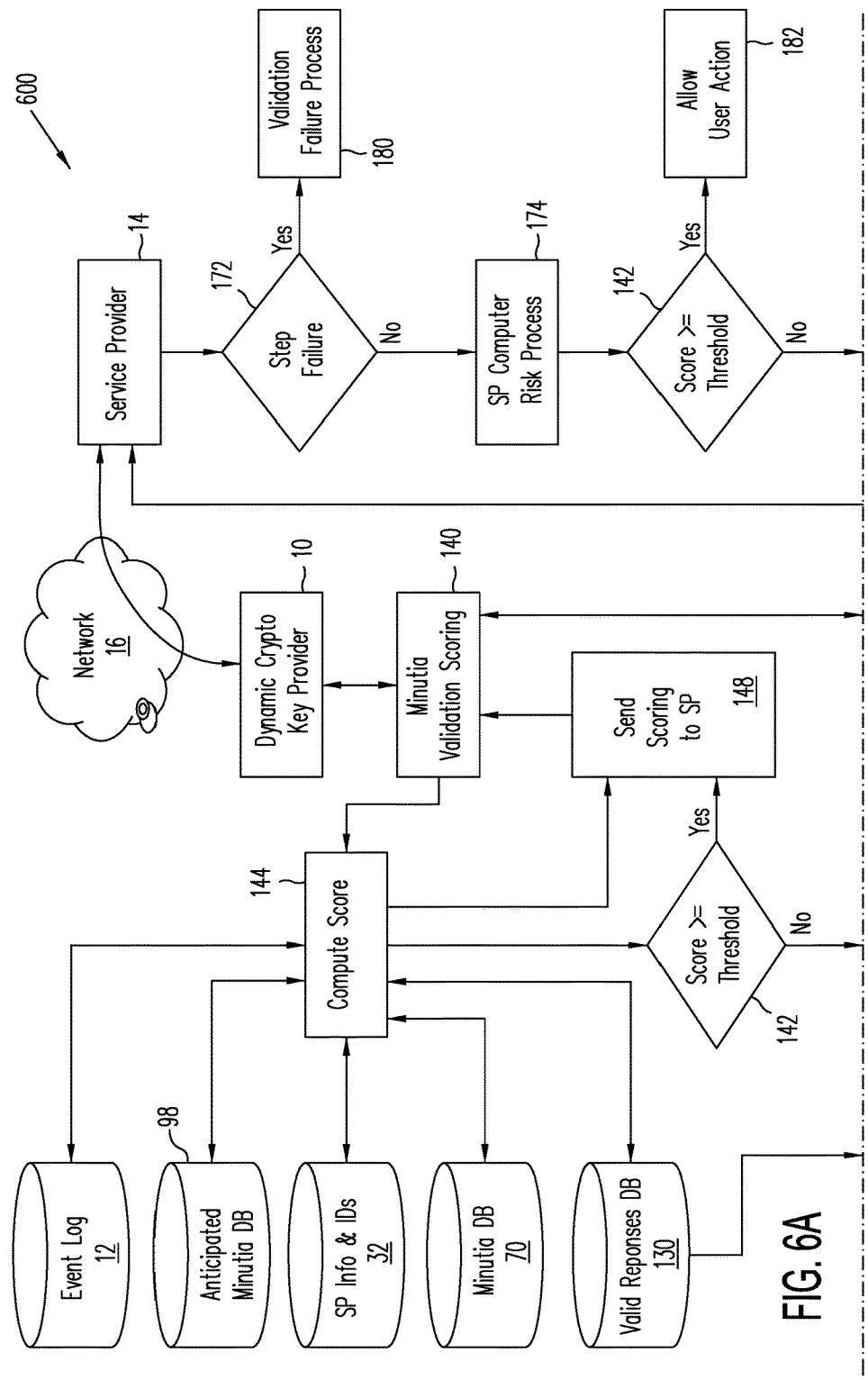

If the response is not an expected response, then a validation failure process as described in FIG. 6B can alert the service provider 14 that the validation has failed.

At step 2060, on a match between the actual response and one of the pre-processed responses, the update computer minutia 128 process may then know what the particular actual minutia values from computer 18 are for the combination selected (e.g., triplet Hx–Fy–Sz) by knowing which possible response has matched the actual response even though neither response contains any direct or decipherable information about the actual minutia values. The values from the valid responses DB 130 used in the response calculation can then be used to update the values stored in the minutia DB 70 database.

Figure 3:
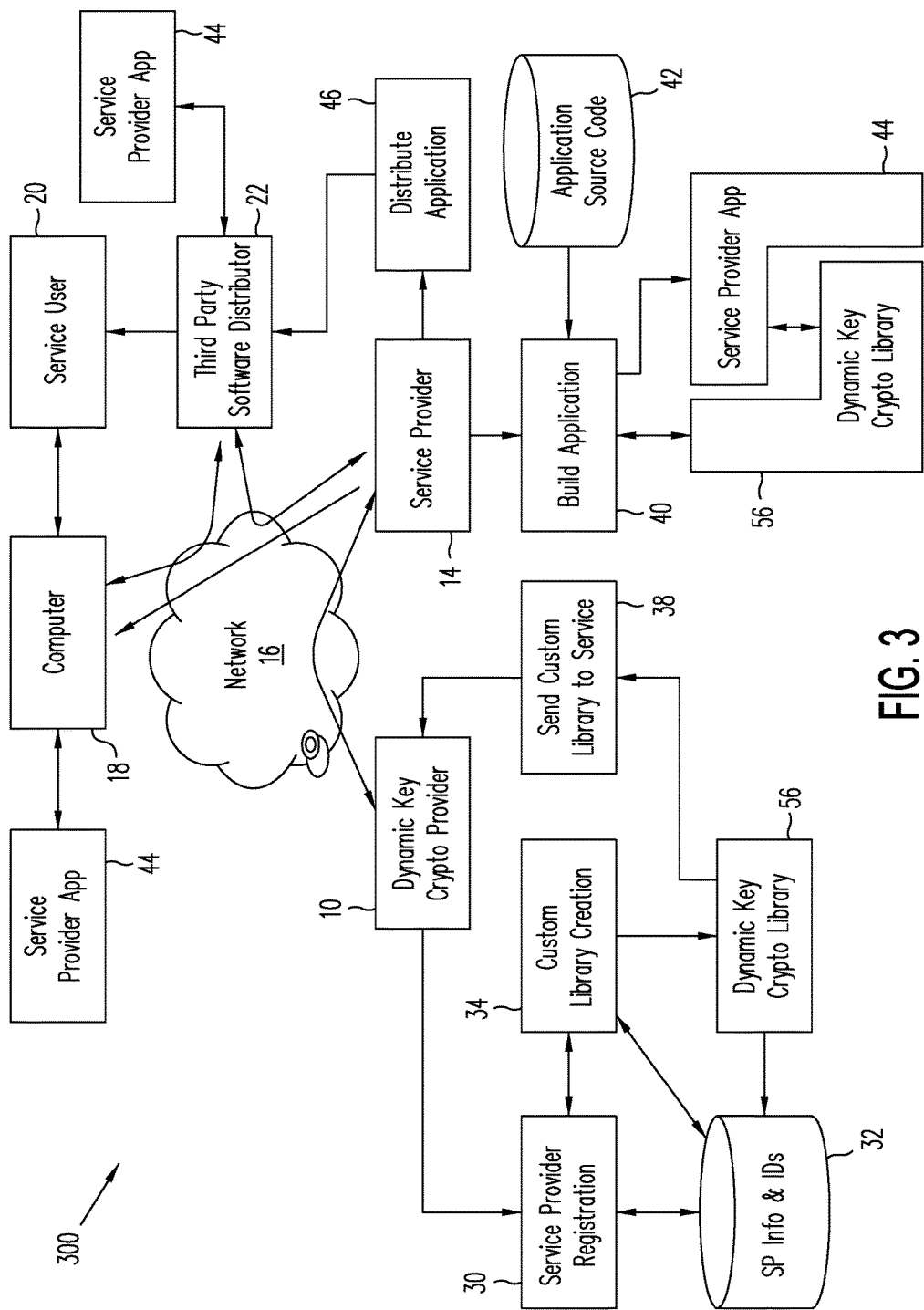
FIG. 3 is a system diagram illustrating a service provider application (app) delivery system in accordance with an embodiment.

FIG. 3 illustrates a service provider application (app) delivery system 300 in accordance with an embodiment. FIG. 3 shows a system for delivering a service provider app 44 to a computer 18 such that the service provider app 44 has included within it a dynamic key crypto library 56 which is unique to the service provider 14 and performs computer security functions on the computer 18.

The service provider app 44 may be similar to a typical industry application except that service provider app 44 makes application programmer interface (API) calls to a dynamic key crypto library 56 that was compiled as a library with the application source code 42 to form the final executable form of the service provider app 44. The service provider app 44 can be shared with the dynamic key crypto provider 10 for analysis to generate minutia values that can validate the integrity of service provider app 44 when service provider app 44 is running on a computer 18. Service provider app 44 may contain or wish to store data that the service provider 14 requires to secure and make private.

Within the dynamic key crypto provider 10 there may be a service provider registration 30 process for registering service provider systems 14 to use system 300. The service provider registration 30 process records and generates data specific to the service provider 14 and stores that data in the SP info and IDs 32 database. Such data can include preferences like PIN utilization (i.e. force a system PIN, use a service PIN, etc.) and minimum scores to allow connection. The SP info and IDs 32 database may be, for example, a list of customers and partners for whom a custom dynamic key crypto library 56 has been created. The SP info and IDs database 32 may include key material used to identify and encrypt data of the service provider 14 throughout the system 300 and a table for indexing minutia. Such SP info and IDs 32 database may uniquely identify the service provider 14 and ensure that features and elements of system 300 used by the service provider 14 are secure and separate from other service provider systems 14 that might use the system 300. This provides service separation of data and identifiers such that multiple, independent service provider systems 14 cannot collude, compare data and infer what might be considered private data or tendencies of a service user 20.

The SP info and IDs 32 data unique to a service provider 14 may be used in a custom library creation 34 process to make a dynamic key crypto library 56 which contains data elements of the SP info and IDs 32 database. In addition to data unique to the service provider 14, the custom library creation 34 process can create code custom to a particular service provider 14. Such custom code can include different encryption algorithms (e.g., AES, RSA, Elliptical curve), different hashing algorithms (e.g., secure hash algorithm (SHA-1), message digest (MDM)), unique system encryption keys, unique look up table routines and orderings, different hashing methods for combining minutia values into dynamic crypto keys (e.g., interleaved bit transformations, reverse-ordering, bit inverse, bit shifting), and minutia definitions and classes uniquely available to a particular service provider 14. All of the customizations when compiled form a dynamic key crypto library 56 unique to the service provider 14 such that a breach of a dynamic key crypto library 56 for one service provider 14 may not affect the dynamic key crypto library 56 of another service provider 14. In addition, even if the exact same minutia values are used to form a dynamic crypto key on the exact same computer 18, the resultant dynamic crypto key for one service provider 14 may be different than the resultant dynamic crypto key for another service provider 14; thus the responses for different instances of service provider 14 would be different even if the exact same challenge was sent.

Because of the different SP info and IDs 32 databases used in the formation of the dynamic key crypto libraries 56, two instances of service provider 14 (e.g., two different online service providers), for example, may be prevented from being able to compare information gleaned from the computer 18 and conclude their individual service provider apps 44 are residing on the same computer 18. This prohibits the profiling of a service user 20 based on multiple instances of service provider 14 connected to their computer 18.

Likewise, because of the unique computational possibilities introduced in the custom library creation 34 that formed the dynamic key crypto library 56, a successful attack against the privacy and security included within a particular dynamic key crypto library 56, may not be successful against a dynamic key crypto library 56 related to another service provider 14.

The dynamic key crypto library 56 is responsible for, among other activities:

1) reading computer minutia 64 found on the computer 18 and facilitating entry by service user 20 of secrets and biometric minutia 26 into computer 18 that can validate that an appropriate service user 20 is using an identified computer 18;

2) communicating computer minutia information across the network 16;

3) responding to dynamic key crypto provider 10 challenges to establish a computer's unique identity, protect data, and perform digital signatures using computer minutia 64 found on the computer 18 and secrets and biometric minutia 26 input by service user 20 into computer 18;

4) processing requests from the dynamic key crypto provider 10 to possibly hold, transfer, or a delete service provider app 44 and itself (dynamic key crypto library 56); and 5) randomizing or obfuscating dynamic key crypto library 56 activity through various mechanisms that make it difficult to intercept sensitive actions.

The dynamic key crypto library 56 created uniquely for the service provider 14 may be sent to the service provider 14 securely over a network 16 in the send custom library to service 38 process using any of several methods. The dynamic key crypto library 56 may include program logic designed to perform security functions both directed by and on behalf of the service provider app 44 by interacting with the computer 18. With newer forms of computer 18 (e.g., smartphones and tablets), a dynamic key crypto library 56 that functions as part of the service provider app 44 when it is running is a more reliable method then independently running applications to access the required services for computer 18. Furthermore, the larger combined code size of the dynamic key crypto library 56 and the service provider app 44 can impose a more tedious and difficult effort to isolate the security functions in an effort to defeat the security.

The service provider 14 may perform an industry typical build application 40 process by combining the dynamic key crypto library 56 with application source code 42 of the service provider 14 to create a service provider app 44. The service provider app 44 can be distributed any number of ways including directly over a network 16 and through a third party software distributor 22 either over the network 16 or directly to the service user 20 for loading on the computer 18 via the distribute application 46 process. The third party software distribution system 22 may be an optional system or systems for distributing software from the service provider 14 to computer 18. Apple's AppStore® is an example of such a software distribution system.

FIG. 4 illustrates a system 400 for registration of computer and user minutiae in accordance with an embodiment. FIG. 4 shows a system for registering a computer 18 with a dynamic key crypto provider 10 and a service provider 14 over a network 16.

The computer 18 may have on it a service provider app 44. When the service provider app 44 is installed, the dynamic key crypto library 56 within the service provider app 44 may run tests to proof the install 76. Proof the install 76 can be part of the dynamic key crypto library 56 and can use a shared secret supplied by service provider 14 through a user authentication 50 process. In this case the service user 20 might answer previously defined questions, recognize historical service usage, and recognize past instances of computer 18 used by service user 20 or other identity proofing methods.

Additionally, the proof the install 76 process can look for other instances of service provider app 44 from other service provider systems 14 and report any found instances back to the dynamic key crypto provider 10 for additional assurances on the history of the computer 18.

After the user authentication 50 is performed, the service provider 14 may send to the dynamic key crypto provider 10 an account identifier that the service provider 14 uses to identify the service user 20. The register computer 68 process binds the account identifier with the computer minutia database (DB) 70 to link the service user 20 to a particular computer 18.

The dynamic key crypto library 56 can sample a wide range of computer minutia 64 and secrets and biometric minutia 26 using the fetch key minutia 58 process including minutiae from the computer 18 (hardware, firmware, and software) and minutiae from the service user 20 (secrets and biometrics). Secrets and biometric minutia 26 may be collected from the service user 20 by the computer 18 or via other conveyance methods. Not all possible minutia values are required to be read at installation; some may be read at a later time.

A process to select minutia for service keys 60 uses some or all of the computer minutia 64 to create encryption and identifier keys that can be used by the dynamic key crypto library 56 and other parts of the systems 100, 200, 300, 400, 500, 600, 700, 800, and 900 for things like encrypted service data 196 stored locally on the computer 18. These selections may be predefined in a dynamic key crypto library 56 or stored in a service key minutia selections 66 database that is managed and secured by the dynamic key crypto library 56.

The service key minutia selections 66 database may reside within a secure element on the computer 18 and can be used for offline processing. The minutia selected by the select minutia for service keys 60 process may be used by the dynamic key crypto library 56 to dynamically build the service keys required by the dynamic key crypto library 56; the keys that result from reading the computer minutia 64 are not stored within the dynamic key crypto library 56 or system 400; they may be computed as they are needed by consulting the service key minutia selections 66 database and using the fetch key minutia 58 process to obtain the resulting computer minutia 64 or secrets and biometric minutia 26. Thus if a service provider app 44 was copied from one computer 18 to another computer 18, when the service keys were built from computer minutia 64, the resulting service key would not be able, for example, to properly decrypt data stored locally on the computer 18.

Some of the computer minutia 64 and secrets and biometric minutia 26 are sent to the dynamic key crypto provider 10 via the transmit minutia to dynamic key crypto provider (DKCP) 62 process. A relatively small amount of computer minutia 64 and secrets and biometric minutia 26 can be sent to the dynamic key crypto provider 10 so the dynamic key crypto provider 10 can look for existing matches to the computer minutia 64 in its minutia DB 70 database. If the dynamic key crypto provider 10 finds matching minutia 64, then the dynamic key crypto provider 10 can send challenge, response, and validation exchanges described in FIG. 2 to verify a wider set of computer minutia 64. If a wider sampling of computer minutia 64 are properly verified by the dynamic key crypto provider 10, then it can possibly deduce that this is another service provider app 44 being added to a computer 18. If the dynamic key crypto provider 10 does not finding matching computer minutia 64 in its minutia DB 70 database, then a subset of computer minutia 64 and secrets and biometric minutia 26 can use the process "transmit minutia to DKCP 62" such that the computer 18 can be properly and uniquely identified and the remainder of computer minutia 64 and secrets and biometric minutia 26 can be learned by the dynamic key crypto provider 10 using the update computer minutia 128 process described in FIG. 2. In this manner, it may be possible to transfer some of the minutia via challenge, response, and validation as described in FIG. 2, and not all of the minutia may need to be transferred via the transmit minutia to DKCP 62 process, which can use several secure transmission methods that may vary by service provider 14 through the customization of the dynamic key crypto library 56.

By performing a transmit minutia to DKCP 62 process, various values of computer minutia 64 and secrets and biometric minutia 26 may be sent along with their minutia descriptor to the dynamic key crypto provider 10 which may perform a register computer 68 process. The register computer 68 process may record the computer minutia 64 and secrets and biometric minutia 26 into a minutia DB 70 along with a reference to the service provider 14 account identifier for the service user 20. The minutia DB 70 can store the type (or category) of minutia, its value and the service identifier for later processing.

The dynamic key crypto provider 10 is able to store the computer minutia 64 and secrets and biometric minutia 26 which have been randomized by the unique dynamic key crypto library 56. The dynamic key crypto provider 10 is also able to decrypt service provider (SP) minutia 74 using SP info and IDs 32 data to learn the actual computer minutia 64. Many of these actual minutia values are known only by the dynamic key crypto provider 10 and may be used later for services to multiple service provider systems 14.

Some of the actual computer minutia 64 and secrets and biometric minutia 26 may be sent to the service provider 14 via a send computer profile to SP 72 process. To protect a service user 20 from being profiled by various instances of service provider 14 that might collude and interpolate minutia values, the descriptive names of the minutia values can be abstracted so their actual meaning is unknown (e.g., counter-1, counter-2, entertainment-1). In addition, where possible, the values of the minutia can be hashed to hide the actual minutia value. The service provider 14 can store computer info 52 into SP computer info DB 54 or store data in the service and user data 24 database (or both). The SP computer info DB 54 information can be useful to the service provider 14 for understanding the types and minutia of computer systems 18 running their service provider app 44 software. Such information might include OS type and version, computer make and model, for example. The service and user data 24 database might contain secrets such as PINs and passwords meaningful to the service provider 14.

Figure 5:
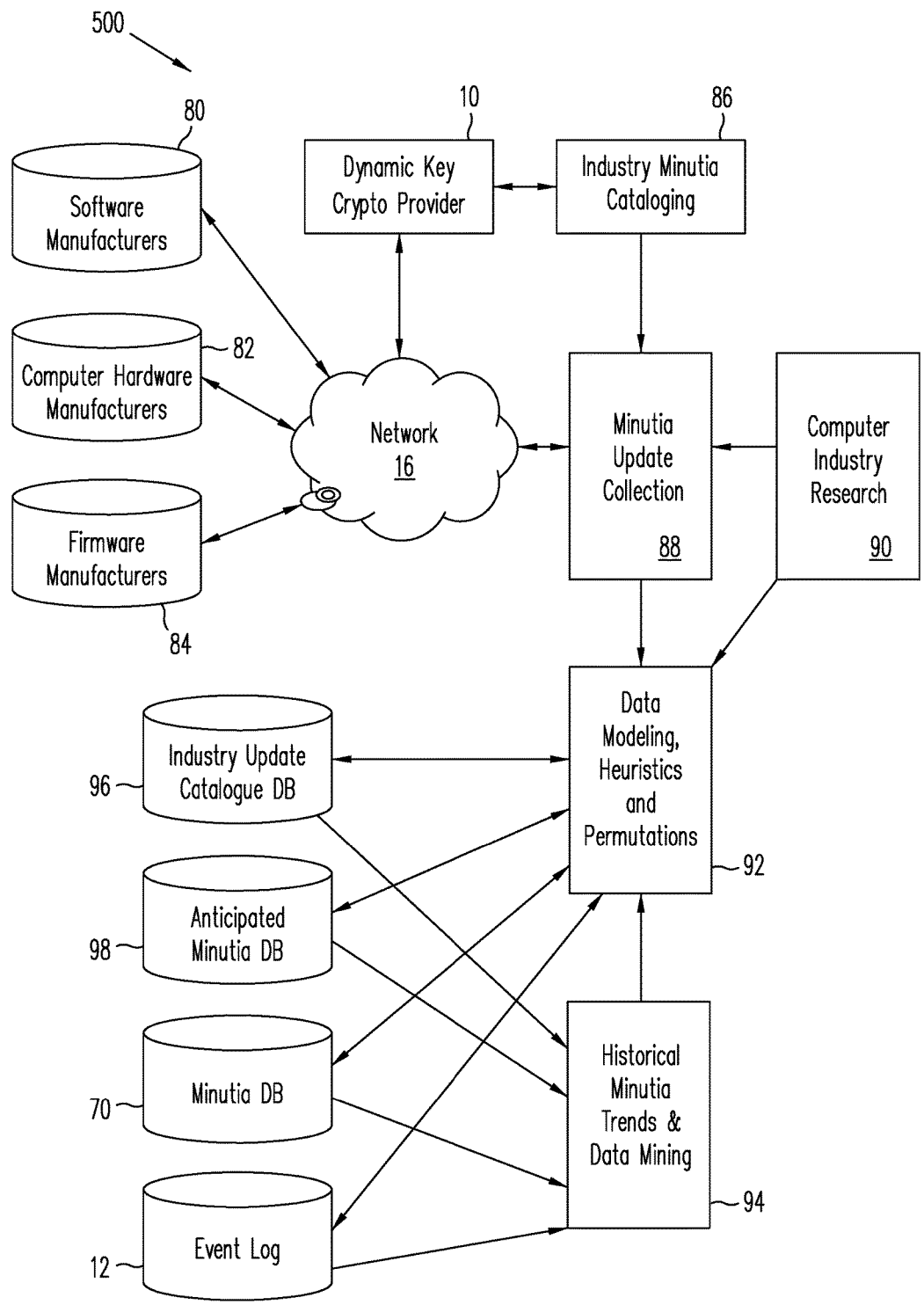
FIG. 5 is a system diagram illustrating a system to catalogue and model industry minutia and user heuristics to create and update anticipated minutia databases in accordance with an embodiment.

FIG. 5 illustrates a system 500 that may be used to catalogue and model industry minutia to create and update anticipated minutia databases in accordance with an embodiment. FIG. 5 shows a system 500 for creating an industry update catalogue DB 96 from a wide range of industry sources and using that information to form an anticipated minutia DB 98.

The dynamic key crypto provider 10 routinely performs industry minutia cataloguing 86 processes for ultimately amassing an industry update catalogue DB 96. This database is for managing a vast but finite collection of industry minutia. Large scale searches, interpolation, multi-upgrade permutation modeling and probability calculations are performed against the data found in the industry update catalogue DB 96.

The industry minutia cataloguing 86 process uses computer industry research 90 to heuristically and empirically perform a minutia update collection 88 process. The minutia update collection 88 process scours a network 16 (for example, the Internet) seeking out information from software manufacturers 80, computer hardware manufacturers 82 and firmware manufacturers 84. Software manufacturers 80 may include, among other entities, software manufacturers, online software storefronts, support services for software, and some operating systems. Computer hardware manufacturers 82 may include, among other entities, manufacturers of PCs, laptops, tablets, smart phones, purpose-built computers, and other hardware often capable of connecting to a network 16. Firmware manufacturers 84 may include, among other entities, software related to hardware (commonly called drivers), some operating system software, software for configuring and controlling access to a network 16 such as a mobile operator network, or public and private cloud networks.

The minutia update collection 88 process collects such information as the computer industry research 90 process may deem beneficial to system 500. The collected data is then given to a data modeling, heuristics and permutations 92 process for analysis with regard, for example, to computer or user device identification. The data modeling, heuristics and permutations 92 process considers historical minutia trends and data mining 94 as well as the current minutia DB 70, the current anticipated minutia DB 98 and the event log 12 which may log actions and exchanges performed by the dynamic key crypto provider 10 for auditing and heuristic analysis at later times. The industry updates themselves can be grouped and related such that one minutia update in the industry update catalogue DB 96 can trigger expected changes in other related minutia values. For example, if an operating system industry update is shown to change fifteen minutia values and the minutia values are not affected by service user 20 usage (including, e.g., build number, build name, subsystem versions, system sizes), then these minutia values can be grouped and inferred or validated collectively in the data modeling, heuristics and permutations 92 process.

Other related minutia values may change as a result of service user 20 usages. This is related but different to service user 20 behavior patterns; minutia values in minutia DB 70 (such as minutia values related to the computer 18) establish the behavior of the minutiae (such as computer 18) and, therefore, behavioral algorithms can be applied to the minutia DB 70 values. For example, if the computer 18 repeatedly connects to a secured wireless LAN (such as one provided by an employer) when the computer 18 is in its 'work' environment during business hours, this could imply a third-party trust of the computer 18 (via, e.g., MAC address validation, WEP key authentication) by the secured wireless LAN; failure to connect under 'normal' working conditions could signal a change such as a lost device or new job. As another example, if values in the minutia DB 70 show that an address book has consistently added addresses over a time period reaching hundreds of names and suddenly the address name count goes to eighty, that could signal ownership by a new service user 20.

From data collected and modeled, the data modeling, heuristics and permutations 92 process records possible minutia values in the anticipated minutia DB 98. The data stored in the anticipated minutia DB 98 is pre-calculated combinations of industry update catalogue DB 96 and minutia DB 70 which are managed and ordered according to probability within the database so that rapid derivative comparisons can be verified and scored against a confidence scale.

For example, when computer industry research 90 discovers a pending operating system release, the minutia update collection 88 process can gather a copy of the newly released operating system from, again for example, the appropriate firmware manufacturers 84. The new operating system is processed by the data modeling, heuristics and permutations 92 function and the resultant minutia stored in the anticipated minutia DB 98 for later use by system 500.

As another example of anticipated minutia, for minutia that represents system counters, the counter information collected from the minutia DB 70 can be increased an allowable range as determined by the data modeling, heuristics and permutations 92 process. All counter values within the allowable range would then be stored in the anticipated minutia DB 98.

In most cases, the data modeling, heuristics and permutations 92 process and the historical minutia trends and data mining 94 process calculate a probability and confidence scoring related to the values stored in the anticipated minutia DB 98. These probability and confidence scoring values are a determinative factor in the confidence scoring system for computer authentication.

FIG. 6 illustrates a system 600 for scoring, confidence rating and step-up processing in accordance with an embodiment. FIG. 6 shows a system 600 for computing a minutia validation scoring 140, comparing the scoring against a threshold defined by the service provider 14 and taking additional actions to process SP step-up request 150 in an effort to increase the scoring over the desired threshold.

The dynamic key crypto provider 10 contains a subsystem for the minutia validation scoring 140. The minutia validation scoring 140 subsystem receives a response validated using the subsystem 200 defined in FIG. 2. The compute score 144 process computes a heuristic and probabilistic scoring of the minutia and minutia values used in the validated response using data from the valid responses DB 130, the SP info and IDs 32 data, the event log 12 and the anticipated minutia DB 98. Information in the valid responses 130 database includes both information representative of the current state of computer minutia on the computer 18 and anticipated minutia from industry sources and service user 20 norms, both of which are described in previous figures and in FIG. 9 with regard to the service provider app 44 subsystem 900.

For example, the scoring for hardware minutiae might be typically higher than the scoring for software minutiae. Firmware minutia values that change as expected may also have a higher confidence scoring. Likewise, software minutiae (such as date) that change as expected may positively affect the overall scoring of the response.

Some minutiae value changes, while possibly anticipated, may negatively affect the overall scoring of the response. For example, if a counter value takes an unusually large jump, it will negatively affect scoring. Also, if firmware minutiae values do not reflect routine updating as per industry norms, the scoring may be negatively affected. In addition, if a computer reset is detected that resets a wide range of minutia back to a known factory default, the resulting score may be lower.

Some minutiae themselves score differently. For example, certain software minutiae may be more predictable and useful than others. So, when a more favored minutia or minutiae are used, the resultant scoring may be higher when compared to validation done with less desirable minutiae.

Because of the vast number of minutiae to be validated, another scoring input can be the time since a particular minutia value was last validated in a challenge and response exchange with the computer 18.

Information outside the scope of a single computer 18 may also impact the scoring. If several instances of a computer 18 are registered to a single service user 20 within a particular service provider 14 as shown in the minutia DB 70, the high number of registered computer 18 may negatively impact the scoring, especially if several computer 18 computers are considered to be equivalent (for example, three smart phones instead of one smart phone, one tablet and one laptop).

After compute score 144 is performed, the resulting score is compared against the initial threshold defined by the service provider 14 and typically sent up during the initial connection to the service provider 14. If the computed score >=threshold 142 then the send score to SP 148 process is used to return the score to the service provider 14 for further consideration.

If the score >=threshold 142 is not true, then the process SP step-up request 150 is performed. Note the similar process SP step-up request 150 process can be performed if the initial threshold or subsequent thresholds are not met, as defined by the service provider 14.

The process SP step-up request 150 performs a compare valid responses and threshold 152 to determine if a possible response and corresponding score are equal to or above the threshold using information from the valid responses 130 database. The process may be governed by a user impact heuristics 154 process which determines the best response and step-up manner in which to increase the score.

If any score >=threshold 156 is true, then specific minutiae as defined in the use selected minutia elements 168 may be used to formulate challenge 116 and system 600 will continue using the system 200 shown in FIG. 2. In this manner, the service users 20 may not be inconvenienced by having to take an action.

If current score+2nd >=threshold 158 is true, then the use three identity factors 170 process may request the dynamic key crypto provider 10 to direct the dynamic key crypto library 56 to collect service user 20 secrets or biometric minutia using computer 18.

If new score+2nd >=threshold 160 then both the new, selected minutia challenge and the use three identity factors 170 processes may be triggered.

If there is no way for a new, selected minutia challenge to achieve a score equal to or higher than the threshold requested by service provider 14, then the send validation failure to SP 162 process is performed.

When the service provider 14 receives a scoring from the Minutia validation scoring 140 from the dynamic key crypto provider 10, it first determines if a step failure 172 occurred. If this is the case, the dynamic key crypto provider 10 is unable to match the threshold desired by the service provider 14. The service provider 14 must then determine how to respond in the validation failure process 180 which, for example, can include denying the service request or conducting an out-of-band identity proofing of the service user 20 that might trigger a new computer 18 registration as shown in FIG. 4.

If the score from the dynamic key crypto provider 10 is not a step-up failure as determined in step failure 172, then the SP risk process 174 compares the score against its own risk tables for the service action requested by the service user 20. If the score >=threshold 142 then the allow user action 182 may be performed; the confidence in the computer 18 and optional service user 20 may be sufficient for the service provider 14 to allow the requested action.

If the score >=threshold 142 fails, then the request step-up authentication from dynamic key crypto 178 process requests the dynamic key crypto provider 10 to perform a process SP step-up request 150 in an effort to get a scoring above the desired threshold.

Figure 7:
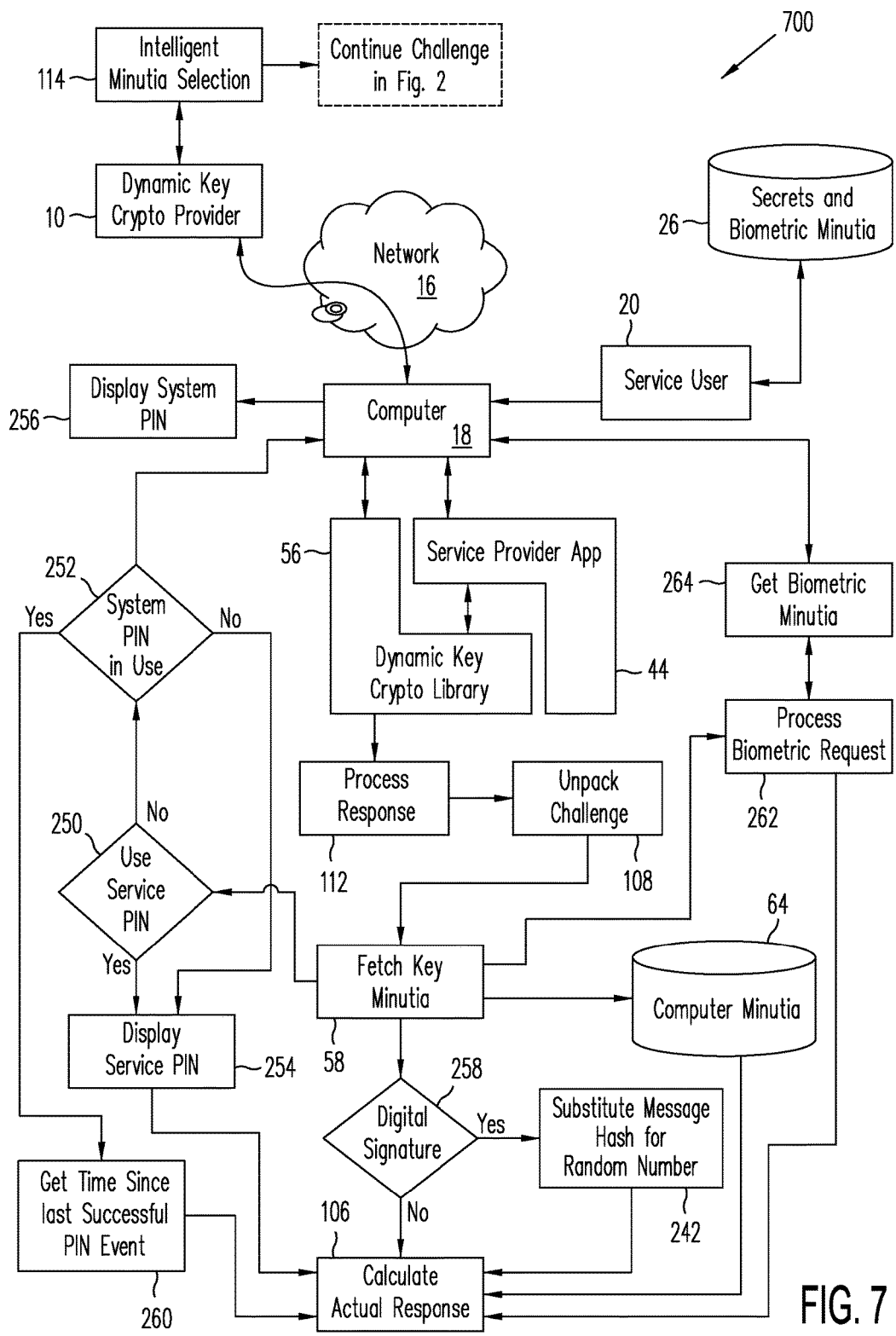
FIG. 7 is a system process flow diagram for an authentication and digital signature system capable of incorporating three identity factors in accordance with an embodiment.

FIG. 7 illustrates an authentication system 700 in accordance with an embodiment. FIG. 7 shows a system 700 for dynamic key cryptography authentication possibly using minutiae from the three identity factors (have, know and are) found on computer 18 or collected from a service user 20.

When a PIN or password entry is required, for example, as a second identity factor to computer 18 identification, the dynamic key crypto provider 10 may perform a use service PIN 250 decision to determine whether a service PIN native to the computer 18 is used or a PIN specific to the service provider 14 is used according to data stored in the SP info and IDs 32 database. The service provider 14 can mandate the use of a service PIN or mandate or allow that the native computer 18 PIN (or password) be used.

The dynamic key crypto provider 10 can request a service user 10 PIN entry by the challenge process described in FIG. 2. In such case, the unpack challenge 108 process can enable the fetch key minutia 58 process to determine a PIN minutia request in the challenge and query use service PIN 250 to determine true or false.

The dynamic key crypto provider 10 can request either the computer 18 (if such functionality exists) to display system PIN 256 or the dynamic key crypto library 56 running on the computer 18 to perform the display service PIN 254 entry processes.

If the service provider 14 allows a PIN native to the computer 18 and the computer 18 is capable of a process to display system PIN 256, then a computer 18 process similar to (or possibly the same as) the display system PIN 256 process is called by the computer 18.

If a use service PIN 250 is yes or a computer 18 is not capable of being remotely directed to display system PIN 256, then the dynamic key crypto library 56 performs the display service PIN 254 entry process.

If use service PIN 250 is not required, then the dynamic key crypto library 56 determines if system PIN in use 252 is yes. If system PIN in use 252 is yes, then the computer 18 native PIN (or password) screen is displayed via the display system PIN 256 process as if, for example, the computer 18 'timed out' and the service user 20 was prompted to re-enter their PIN.

If use service PIN 250 is yes or a system PIN in use 252 is no, then the dynamic key crypto library 56 performs the display service PIN 254 process and a custom PIN entry screen is shown. The valid PIN can be a pre-determined number between the service provider 14 and the service user 20 or can be set during the computer system registration system in FIG. 4 as part of the proof the install 76 process or some other registration process.

Regardless of the PIN screen displayed, the service user 20 enters a PIN into the computer 18 using the secrets and biometric minutia 26 information the service user 20 possesses. When the system PIN in use 252 is true the validation of the PIN is performed by the computer 18 itself. When a correct PIN is entered, the dynamic key crypto library 56 can perform a get time since last successful PIN event 260 process and return the new time since a valid last PIN entry to the dynamic key crypto provider 10. In this manner, a service user 20 may not have to enter multiple PINs or the same PIN multiple times to show they are in possession of the device; the system PIN acts a universal PIN for all protected service provider apps 44 running on the computer 18. When use service PIN 250 is true, the dynamic key crypto library 56 uses the PIN value entered by the service user 20 into the computer 18 to calculate actual response 106 which is then returned to the dynamic key crypto provider 10 for validation as described in FIG. 2.

If a valid PIN entry is not performed, the dynamic key crypto library 56 may time-out and return the failure to the dynamic key crypto provider 10.

In another example, the fetch key minutia 58 process may result in a process biometric request 262. In such case, the get biometric minutia 264 process will interact with the computer 18 to collect the secret and biometric minutia 26 data from service user 20 via entry into computer 18. The biometric minutia values can then be used to calculate actual response 106 which is then returned to the dynamic key crypto provider for validation as described in FIG. 2.

In still another example, the fetch key minutia 58 process may determine a digital signature 258 is requested and perform a digital signature via a substitute message hash for random number 242 process. In this manner, the hash or digest of an action (such as a transaction receipt or other summary) can be signed by the minutia returned by the fetch key minutia 58 process using the calculate actual response 106 process. The fetch key minutia 58 process may fetch any number of minutia values covering any or all of the three factors of identity ("have", "know", and "are", e.g., respectively, the computer 18, the secrets service user 20 knows or represents or biometric minutia (from secrets and biometric minutia 26)).

As an illustrative example, to form a digital signature, the contents of a message can be hashed so that changes to the message contents form a different hash and any changes to the message become evident. The hash can then be 'signed' (encrypted) using a dynamic crypto key that contains minutiae that represent the computer 18 on which the signature occurred including relatively stable minutia (e.g., hardware minutia), geo-location minutia, and fast changing minutia (e.g., date, counters) that establish the computer 18 on which the signature was performed, where the signature was performed and multiple minutia values that collectively could validate when the signature occurred. In addition, the minutia used to form the signing dynamic crypto key could include secrets (e.g., PIN) that only a service user 20 should know and biometric minutia (e.g., facial geometry) that only a service user 20 could produce to establish who digitally signed the digest. In this manner, the dynamic crypto key can bind the instrument, place, time and person to a particular message. Thus, a very wide range of minutia can be used in the dynamic signature key (not a single triplet, but potentially dozens or even hundreds of minutia values). Furthermore, the behavioral trajectory of the computer 18 could be considered before and after the signature to lend credibility to the digital signature performed.

Figure 8:
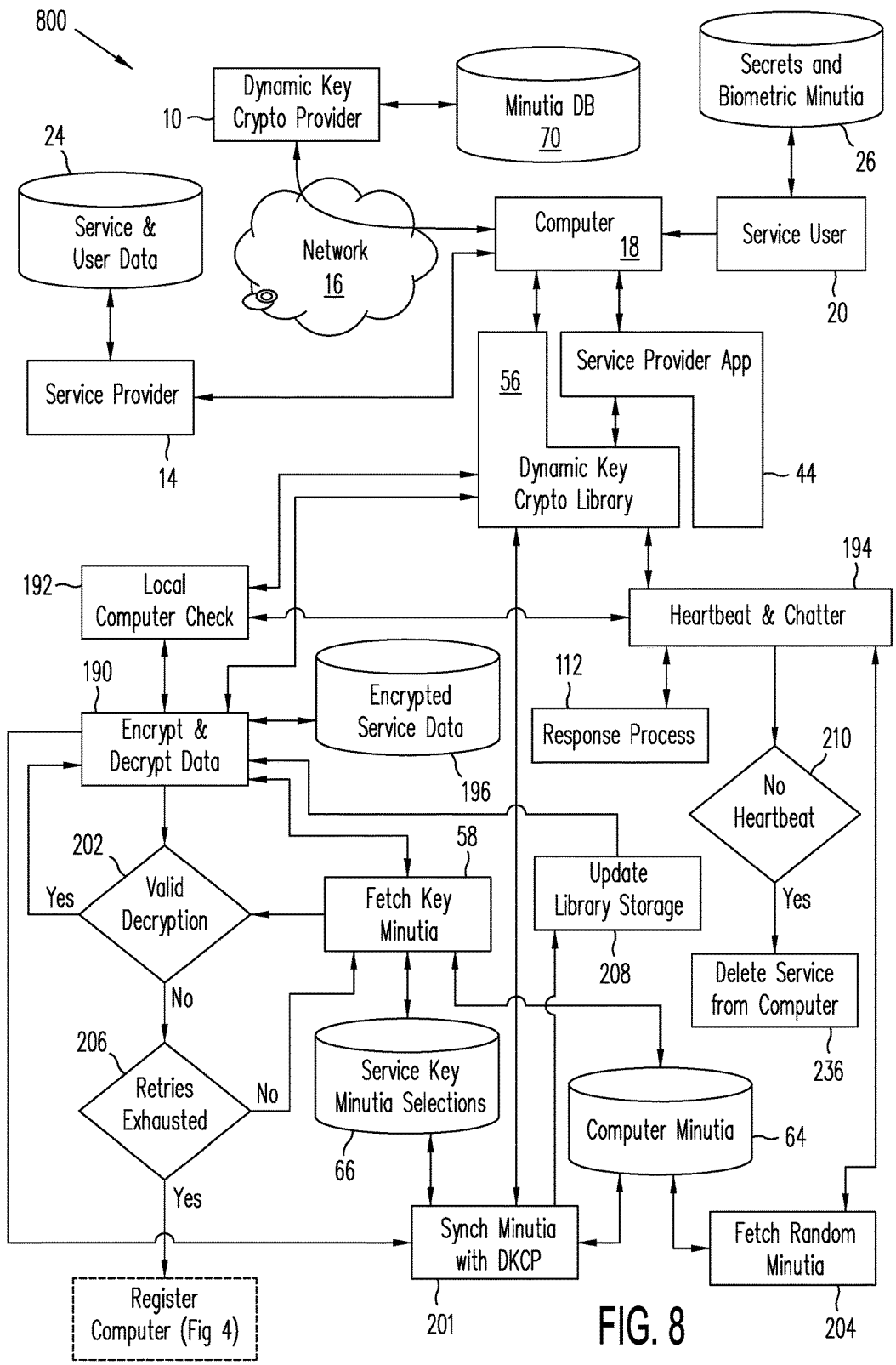
FIG. 8 is a system process flow diagram illustrating a system for application processing for local and update data security functions in accordance with an embodiment.

FIG. 8 illustrates a system 800 for application processing for data protection security functions in accordance with an embodiment. FIG. 8 shows a system 800 for processing interaction between the service provider app 44 and the dynamic key crypto library 56 to improve the security of both while running on a computer 18.

On the computer 18, the service provider app 44 may have been installed which contains a dynamic key crypto library 56 which may be unique to the service provider 14. The dynamic key crypto library 56 can process responses from the dynamic key crypto provider 10 to establish a heartbeat and chatter 194, possibly triggering a delete service from computer 236 self-destruction when there is no heartbeat 210 and randomize or obfuscating dynamic key crypto library 56 activity through heartbeat and chatter 194 system calls to make it difficult to intercept sensitive actions.

The dynamic key crypto library 56 performs some of its activities in direct response to either calls by the service provider app 44 or the dynamic key crypto provider 10. For the randomization, obfuscation and sampling of the computer minutia 64, the dynamic key crypto library 56 can perform tasks while the service provider app 44 is idle, waiting for response from either the service user 20 or other external drivers; often this is referred to as waiting in the event loop.

The service provider app 44 can encrypt and decrypt data 190 to securely and privately store service provider 14 and service user 20 data on the computer 18 in encrypted service data 196. The encrypt and decrypt data 190 process can use the service key minutia selections 66 database to determine which minutia the fetch key minutia 58 process should fetch from the computer minutia 64 found on the computer 18 or the fetch key minutia 58 can receive instructions from the dynamic key crypto provider 10.

In this manner, the encrypt and decrypt data 190 process may not actually store the keys used in encrypting and decrypting data; the keys are computed as required from the computer minutia 64. Thus, when the encrypted service provider 14 data and service user 20 data is stored in the encrypted service data 196 database, it cannot be decrypted unless the same computer minutia 64 are present on the computer 18. Copying the service provider app 44 or encrypted service data 196 (or both) will not enable the decryption of the encrypted service data 196.

Encrypted data to be processed by encrypt and decrypt data 190 can be transmitted securely from the service provider 14 over a network 16 to the computer 18, input into computer 18 by service user 20 or generated locally on the computer 18 by the service provider app 44 or dynamic key crypto library 56. In the case where the encrypted service data 196 is added or changed by the service provider app 44 or dynamic key crypto library 56, the service provider 14 can be updated with the encrypted service data 196 over a secure communication between the computer 18 and the service provider 14 using the network 16. The encrypt and decrypt data 190 process is intended to function on data at rest on the computer 18, not data typically in transit over a network 16. However, the same key creation processes based on computer minutia 64 found on the computer 18 can be used for many types of data protection.

The dynamic key crypto library 56 can also enable a local computer check 192 which uses the encrypt and decrypt data 190 to randomly validate computer minutia 64. In this manner, random data can be encrypted and, at a later time, decrypted to verify the computer minutia 64 are still valid, and thus the service provider app 44 is running on the intended computer 18. Similar verifications can be made by the dynamic key crypto provider 10 using challenge, response, and validation system 200 described in FIG. 2.

Since the computer minutia 64 may contain minutia that change with normal use and time, the encrypt and decrypt data 190 may fail after those changes. For fault tolerance of the system, the encrypt and decrypt data 190 can process the data using multiple subsets from the large range of possible computer minutia 64. In this manner, the encrypt and decrypt data 190 can compute several different copies of encrypted data based off a very wide range of computer minutia 64. The number of different instances of encryptions based off a single plain text source can be controlled by the dynamic key crypto library 56 which is customizable for each service provider 14.

When encrypting plain text data, the encrypt and decrypt data 190 process uses the fetch key minutia 58 process the required number of times as controlled by the dynamic key crypto library 56. Each time a fetch key minutia 58 is performed, the corresponding minutia indexes are read from the service key minutia selections 66 and the resultant computer minutia 64 is read. The service key minutia selections 66 can be, for example, stored locally on computer 18, stored in a secure element on computer 18, or stored in the dynamic key crypto provider 10 data and be directed using the challenge, response, and validation system 200 described in FIG. 2. Each return of fetch key minutia 58 contains a set of minutia values hashed and used by the encrypt and decrypt data 190 process to encrypt the plain text data and stores the encrypted result in the encrypted service data 196. Thus, multiple encryptions of the same plain text may be stored in encrypted service data 196 database.

When attempting to decrypt data in encrypt and decrypt data 190 process, the fetch key minutia 58 process follows the same logic in determining the service key minutia selections 66 and then fetching the related minutia from the computer minutia 64. When the fetch key minutia 58 returns the minutia values to the encrypt and decrypt data 190, the encrypt and decrypt data 190 retrieves the encrypted values from the encrypted service data 196 and uses a hash of the minutia values to decrypt the information.

If the decryption performed by the encrypt and decrypt data 190 does not properly decrypt the plain text—determined by some means of checksum, know plain text tests or other means in the valid decryption 202 determination—then the number of retries exhausted 206 is compared. If more encrypted instances of the plain text exist, then the next set of fetch key minutia 58 is performed which uses the service key minutia selections 66 to index another subset of minutia values which are then retrieved from the computer minutia 64 information.

This loop of fetch key minutia 58, valid decryption 202 and retries exhausted 206 is performed until a valid decryption of the data occurs or no more retries remain. If retries exhausted 206 returns true before a valid decryption of the data occurs, then the system faults and triggers a re-registration of the computer 18 as shown in FIG. 4 or the original minutia values used when the encryption was done can be returned by the dynamic key crypto provider 10 to the dynamic key crypto library 56.

If a valid decryption 202 was found, then the encrypt and decrypt data 190 can perform a synch minutia with DKCP 201 on any minutia that failed to properly decrypt the plain text. When a synch minutia with DKCP 201 is performed, the changed minutia selections are indexed from the service key minutia selections 66, the changed minutia is read from the computer minutia 64 and given to the dynamic key crypto library 56 for secure transmission over the network 16 to the dynamic key crypto provider 10 which stores the updated minutia values in the minutia DB 70.

The synch minutia with DKCP 201 process can also perform an update library storage 208 function which calls on the encrypt and decrypt data 190 process to recalculate the failed decryptions using the new minutia found in the computer minutia 64.

When the dynamic key crypto library 56 connects to the dynamic key crypto provider 10 to update computer minutia of the computer 18, the dynamic key crypto provider 10 performs an authentication just as if the computer 18 was connecting to a service provider 14.

The dynamic key crypto library 56 can also have a heartbeat and chatter 194 process that, for example, may: 1) perform random activity on the computer 18; 2) function as a heartbeat between the dynamic key crypto library 56 and the dynamic key crypto provider 10; and 3) obscure and obfuscate meaningful actions.

The heartbeat and chatter 194 process can periodically perform a response process 112 using a challenge sent by the dynamic key crypto provider 10. Recall that the dynamic key crypto provider 10 can send a number of challenges to the dynamic key crypto library 56 for later processing. In this manner (described in FIG. 2) minutia values can be inferred and updated between the computer 18 and the dynamic key crypto provider 10.

This or a similar process can also serve as a heartbeat between the computer 18 and the dynamic key crypto provider 10. If the heartbeat and chatter 194 process does not perform a valid challenge and response cycle within a timeframe defined by service provider 14 and stored within their customized version of the dynamic key crypto library 56, as shown in the no heartbeat 210 decision, then the heartbeat and chatter 194 process can call the delete service from computer 236 process described in FIG. 8.

The heartbeat and chatter 194 process may also periodically fetch random minutia 204 reads of the computer minutia 64 to utilize a wide search space for any malicious parties listening to systems calls made on the computer 18.

The heartbeat and chatter 194 may also randomly call the local computer check 192 process.

The heartbeat and chatter 194 may perform all of these functions to improve security and obfuscate critical actions. The heartbeat and chatter 194 may be most often called during the event loop of a service provider app 44 so as not to impact performance. The heartbeat and chatter 194 process may also be intelligent so as not to overly use battery power, network bandwidth, or other system resources.

Figure 9:
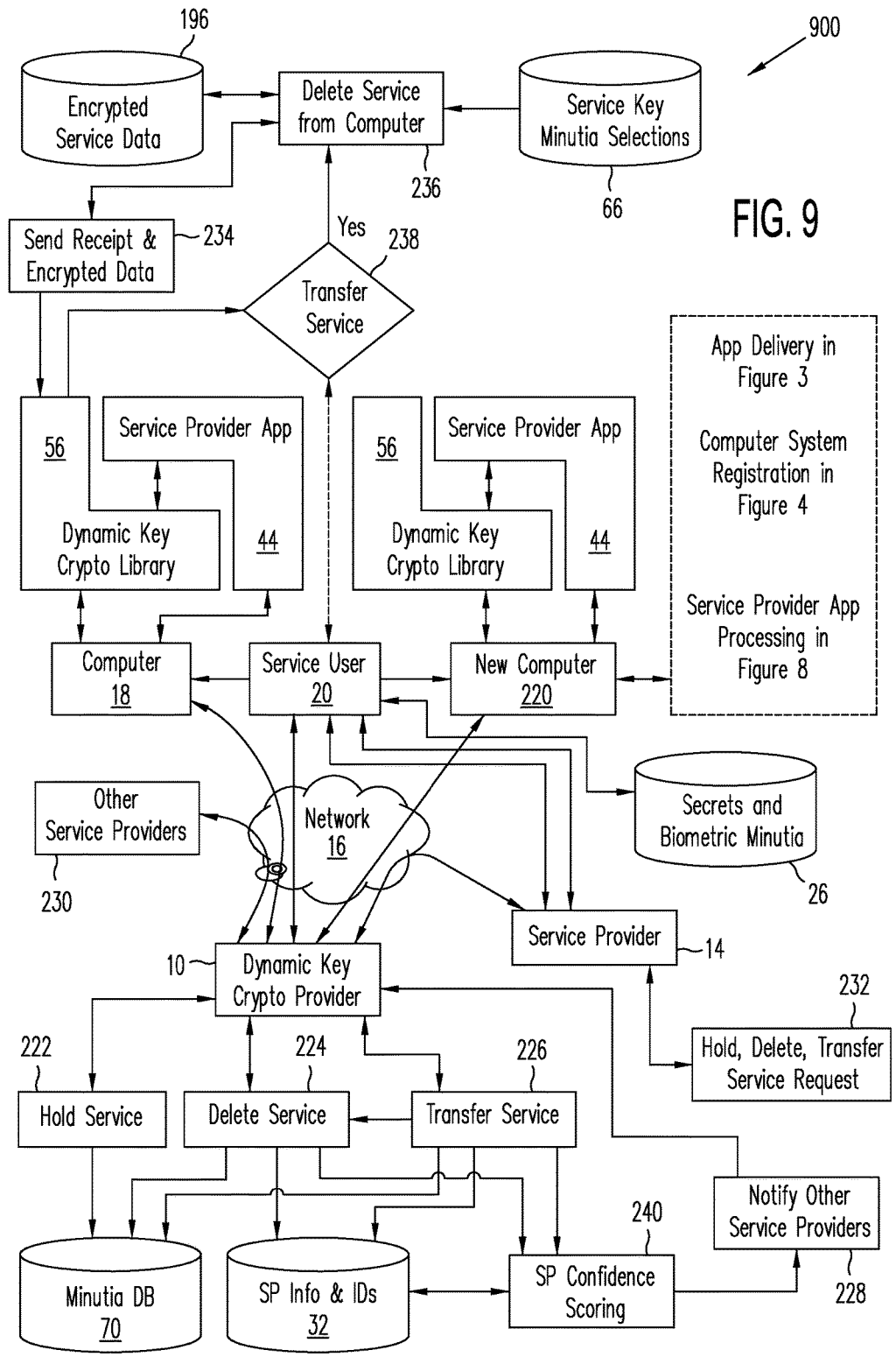
FIG. 9 is a system diagram illustrating computer identity provider lifecycle functionality and services to service providers in accordance with an embodiment.

FIG. 9 illustrates computer identity provider lifecycle functionality and services to service providers in accordance with an embodiment. FIG. 9 shows a system 900 for managing the lifecycle of a service provider 14 and a computer 18 including deleting and transferring services from one computer 18 to a new computer 220 and notifying service provider systems 14 of a new computer 220.

The transfer service 226 process can be triggered by several events such as: 1) a new computer 220 being detected as a possible replacement to the computer 18; 2) a service user 20 requesting a service transfer to the service provider 14; 3) a reaction to either trigger 1 or trigger 2, causing other service providers 230 to proactively transfer their service provider app 44.

When a new computer 220 performs the registration system 400 shown in FIG. 4, if the dynamic key crypto provider 10 discovers that the account identifier supplied by the service provider 14 is already in use by a similar computer 18 (for example, a second smart phone) then a transfer service 238 message can be added as part of the registration process. If required, the service user 20 agrees to transfer service from their old computer 18, then the dynamic key crypto provider 10 can perform the transfer service 226 process.

When the service user 20 notifies the service provider 14 that their computer 18 is no longer valid due to loss, theft, replacement, or some other event, then the service provider 14 can request the dynamic key crypto provider 10 to perform a hold, delete, transfer service 232.

When a transfer service 226 process is performed, the dynamic key crypto provider 10 can perform a notify other service providers 228 process that notifies the other service providers 230 who have an account identifier registered to that particular computer 18. Upon notification, the dynamic key crypto provider 10 can share a SP confidence scoring 240 based off information in the SP info and IDs 32 database on the initiating service provider 14 to gauge the validity of the action. The other service providers 230 can, at their discretion, direct the dynamic key crypto provider 10 to perform a hold service 222, a transfer service 226, a delete service 224, or even take no action.

The notify other service providers 228 process stores only the minimal amount of service provider 14 information—such as pointer to the service provider 14 and an account identifier for the service user 20—to link a computer 18 to a service provider 14; personal identifiable information of the service user 20 may not be stored or logged by the dynamic key crypto provider 10.

For a hold service 222, the dynamic key crypto provider 10 can update the minutia DB 70 such that it may send a send validation failure to SP 162 for the held computer 18 which will cause a validation failure process 180 to occur and, ultimately, may prompt contact of the service user 20 by the service provider 14 customer care effort.

For a delete service 224, the dynamic key crypto provider 10 can instruct the dynamic key crypto library 56 running on the target computer 18 to completely erase the encrypted service data 196 and the service key minutia selections 66 if present, sending a confirmation erase send receipt and encrypted data 234 when the data stores are erased. After the send receipt and encrypted data 234 is sent, the dynamic key crypto library 56 can self-destruct by deleting the service provider app 44 if desired.

For a transfer service 226, the delete service 224 is called to affect the old computer 18. The service provider app delivery system 300 shown in FIG. 3 is then performed. Afterward, the computer system registration system 400 in FIG. 4 may then be performed to completely transfer the service from the old computer 18 to the new computer 220. The reloading of service and user data 24 may also be performed as described in FIG. 8 with the data being encrypted to computer minutia 64 found on the new computer 220.

Both the delete service 224 and the transfer service 226 cause the minutia DB 70 to reflect the decommissioning of the old computer 18. The old computer 18 minutia data is not deleted from the minutia DB 70 so it can be recognized for other service providers 230 or if the computer 18 performs a new registration either maliciously or through other events such as giving or selling the computer 18 to another service user 20.

Various alternative embodiments are possible. For example, in one alternative embodiment, the dynamic key crypto provider 10 may be a multi-tier distribution model that supports tiered ecosystems of service provider systems 14. In this manner, the dynamic key crypto provider 10 presiding over an eco-system can resolve the minutia within the minutia DB 70 to determine that separate instances of a service provider 14 are referencing the same computer 18. This allows the dynamic key crypto provider 10 to perform the computer identity provider lifecycle functionality shown in FIG. 9 on their own ecosystem. Only the top tier dynamic key crypto provider 10 can resolve the absolute minutia value from a computer 18. Certain data will need to be exported from the sub-tier dynamic key crypto provider 10 to the master dynamic key crypto provider 10 to facilitate the lifecycle functionality shown in FIG. 9.

In various embodiments, parts of the dynamic key crypto provider 10 can be designed to run onsite for a particular service provider 14 to allow data ownership. Certain data will need to be exported from the onsite dynamic key crypto provider 10 to the master dynamic key crypto provider 10 to facilitate the lifecycle functionality shown in FIG. 9.

Also, for example, the dynamic key crypto library 56 does not need to be included in a service provider app 44 in all cases. Some instances of a service provider 14 may not require additional application code at the computer 18 or may use a web browser as their service portal. In this case, the dynamic key crypto library 56 will still exist on the computer 18 but may be a stand-alone, callable routine or a shared resource for the computer 18. If the dynamic key crypto library 56 is a shared resource, certain application processing functions as shown in FIG. 8 may be compartmentalized within the dynamic key crypto library 56 to achieve the same, for example, service provider 14 and encrypted service data 196 separation.

In another example, the service provider 14 may also have the ability to make system calls directly to the dynamic key crypto library 56 rather than through an interface of the service provider app 44.

In another example, service provider app 44 may not communicate directly with dynamic key crypto library 56, but communication performed via exchanges between service provider 14 and dynamic key crypto provider 10 who independently communicate with service provider app 44 and dynamic key crypto library 56, respectively.

In another example, challenges could be stored on the computer 18 to facilitate faster launch of the service provider app 44 and offline processing.

In another example, anomalies in computer 18 minutiae might also be used to detect computer malware or other abnormal processing considerations.

In another example, the challenge, response and validation described in system 200 could be originate from the computer 18 and be useful for service provider 14 authentication and protected data exchange; this enables mutual authentication and benefits for the system.

In another example, the dynamic key crypto system can facilitate digital rights management for content where the content can only be decrypted on a specific computer 18 by using computer minutiae 64 specifically from computer 18 and content can be only decrypted for viewing by a specific user when they enter secrets and biometric minutia 26.

In another example, the anticipated minutia DB 98 can be expanded to model biometric minutia from secrets and biometric minutia 26 to address maturity and aging of service user 20 for biometric minutiae such as, for example, voice and facial recognition.

In another example, some forms of a computer 18 that can connect to a network 16 may not be designed for service user 20 interaction, for example machine-to-machine systems. Embodiments may still be extremely useful in this case—for what else is there to identify than the computer 18—but the secrets and biometric minutia functionality may not apply.

In various embodiments, the encrypt and decrypt data 190 process generally functions on service and user data 198 stored on the computer 18 locally in the encrypted service data 196 database. In another alternative embodiment, however, the same encryption key processing could be used to secure service and user data 198 as it is transferred over a network 16. In a similar manner, the minutia DB 70 maintained by the dynamic key crypto provider 10 may be used to decrypt the service and user data 198 when received from the computer 18.

Implementations of various embodiments may include computers connecting to the Internet or other networks and computers connecting to a network including but not limited to traditional PCs non-traditional PCs (i.e. smart phones, smart tablets); purpose-built network computers (i.e. smart meters, network equipment, appliances); and computers without a user interface (i.e. machine-to-machine functionality). Various embodiments may include identifying computers which connect to a network; identifying computers which connect to each other with or without concurrent connection to a wide-area network; authenticating computer connections to an online service; authenticating users to an online service; and encrypting information stored on a computer In implementation of the various embodiments, embodiments of the invention may comprise a personal computing device, such as a personal computer, laptop, PDA, cellular phone or other personal computing or communication devices. The payment provider system may comprise a network computing computer, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the embodiments.

Logic may be encoded in a computer readable and executable medium, which may refer to any medium that participates in providing instructions to the processor for execution.

Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
a non-transitory memory storing information associated with one or more identities, wherein the information stored for a first identity includes a plurality of identity validation objects comprising an attribute type, an attribute value associated with the attribute type, and information related to one or more anticipated changes for modifying the attribute value, wherein the attribute value is obtained based on user customization data generated from user activities on a first device associated with the first identity; and
one or more hardware processors in communication with the non-transitory memory and configured to execute instructions to cause the system to perform operations comprising:
receiving, from a second device not associated with the first identity, a request to use a service associated with the first identity, wherein the request comprises a message generated based on a data value from the second device corresponding to a first attribute type;
retrieving a first identity validation object that corresponds to the first identity and the first attribute type, the first identity validation object comprising a first attribute value and first information related to one or more anticipated changes for modifying the first attribute value;
generating a set of possible attribute values corresponding to the first identity and the first attribute type by applying the first information to the first attribute value;
determining whether the data value used to create the message corresponds to at least one possible attribute value from the set of possible attribute values; and
granting the second device access to use the service based on the determining.

2. The system of claim 1, wherein the requested service comprises registering the second device to be associated with the first identity.

3. The system of claim 2, wherein the operations further comprise in response to granting the second device access to use the service:

receiving biometric data of a user from the second device; and associating the received biometric data of the user with the first identity.

4. The system of claim 1, wherein the requested service comprises accessing a user account associated with the first identity.

5. The system of claim 4, wherein the user account is an account with a website.

6. The system of claim 1, wherein the operations further comprise disassociating the first device from the first identity in response to the request.

7. The system of claim 1, wherein the determining comprises:

computing a score indicating a likelihood that the data value from the second device corresponds to the first identity based at least in part on comparing the at least one possible attribute value against other possible attribute values in the set of possible attribute values; and determining whether the computed score passes a predetermined threshold.

8. The system of claim 1, wherein the plurality of identity validation objects includes objects representing at least three non-static characteristics associated with the first identity selected from the group of non-static characteristics comprising: user added data, calling application data, software component data, network connection data, and geo-location data.

9. The system of claim 1, wherein the data value from the second device serves a purpose for the second device other than a security purpose.

10. The system of claim 1, wherein the operations further comprise:

generating the first information related to the one or more anticipated changes for modifying the first attribute value; and incorporating the generated first information into the first identity validation object.

11. The system of claim 10, wherein generating the first information comprises:

retrieving, from an external source over a network, data related to one or more potential changes to a non-static characteristic of the first identity corresponding to the first attribute type; and deriving the first information related to the one or more anticipated changes based on the retrieved data and the first attribute value.

12. A method comprising:

storing information associated with one or more identities, wherein the information stored for a first identity includes a plurality of identity validation objects comprising an attribute type, an attribute value associated with the attribute type and obtained based on user customization data generated from user activities on a first device associated with the first identity, and information related to one or more anticipated changes for modifying the attribute value;

receiving, from a second device not associated with the first identity, a request to use a service associated with the first identity, wherein the request comprises a message generated based on a data value from the second device corresponding to a first attribute type;

retrieving a first identity validation object that corresponds to the first identity and the first attribute type, the first identity validation object comprising a first attribute value and first information related to one or more anticipated changes for modifying the first attribute value;

generating a set of anticipated attribute values corresponding to the first identity and the first attribute type by applying the first information to the first attribute value;

determining whether the data value used to create the message corresponds to at least one anticipated attribute value from the set of anticipated attribute values; and granting the second device access to use the service based on the determining.

13. The method of claim 12, wherein the requested service comprises registering the second device to be associated with the first identity.

14. The method of claim 13, further comprising in response to granting the second device access to use the service, receiving biometric data of a user from the second device; and associating the received biometric data of the user with the first identity.

15. The method of claim 12, wherein the requested service comprises accessing a user account associated with the first identity.

16. The method of claim 15, wherein the user account is an account with a website.

17. The method of claim 12, further comprising disassociating the first device from the first identity in response to the request.

18. The method of claim 12, wherein the determining comprises:

computing a score indicating a likelihood that the data value from the second device corresponds the first identity based at least in part on comparing the at least one anticipated attribute value against other anticipated attribute values in the set of anticipated attribute values; and determining whether the computed score passes a predetermined threshold.

19. The method of claim 12, wherein the plurality of identity validation objects includes objects representing at least three non-static characteristics associated with the first identity selected from the group of non-static characteristics comprising: user added data, calling application data, software component data, network connection data, and geo-location data.

20. The method of claim 12, wherein the data value from the second device serves a purpose for the second device other than a security purpose.

* * * * *